(12) United States Patent
Kato

(10) Patent No.: US 7,237,449 B2
(45) Date of Patent: Jul. 3, 2007

(54) DRIVE MECHANISM AND MOVABLE TABLE UNIT PROVIDED WITH THE SAME

(75) Inventor: Heizaburo Kato, Shizuoka (JP)

(73) Assignee: Sankyo Seisakusho Co., Tokyo (JP)

( * ) Notice: Subject to any disclaimer, the term of this patent is extended or adjusted under 35 U.S.C. 154(b) by 580 days.

(21) Appl. No.: 10/690,814

(22) Filed: Oct. 23, 2003

(65) Prior Publication Data

US 2004/0144191 A1 Jul. 29, 2004

(30) Foreign Application Priority Data

Oct. 24, 2002 (JP) ............................. 2002-309760
Oct. 8, 2003 (JP) ............................. 2003-349888

(51) Int. Cl.
*F16H 1/16* (2006.01)
*F16H 1/20* (2006.01)
*F16H 25/12* (2006.01)

(52) U.S. Cl. ........................... 74/425; 74/25; 74/89.14; 74/57

(58) Field of Classification Search ............... 74/27, 74/25, 415, 425, 422, 29, 31, 89, 89.14, 424.06, 74/56, 57
See application file for complete search history.

(56) References Cited

U.S. PATENT DOCUMENTS

| | | | | |
|---|---|---|---|---|
| 3,296,880 A | * | 1/1967 | Maroth | 74/424.93 |
| 4,541,297 A | * | 9/1985 | Fujita | 74/424.6 |
| 4,627,591 A | * | 12/1986 | Heckmann | 248/411 |
| 4,765,651 A | * | 8/1988 | Unger | 280/804 |
| 4,898,004 A | * | 2/1990 | Richardson | 62/255 |
| 4,898,044 A | * | 2/1990 | Galloway | 74/424.6 |
| 5,216,932 A | * | 6/1993 | Takei | 74/479.01 |
| 5,613,403 A | | 3/1997 | Takei | |
| 5,644,950 A | * | 7/1997 | Parsons | 74/57 |

(Continued)

FOREIGN PATENT DOCUMENTS

EP      3 366 594       5/1990

(Continued)

OTHER PUBLICATIONS

Chinese Office Action dated Jul. 22, 2005, directed to counterpart foreign application.

(Continued)

*Primary Examiner*—Thomas R. Hannon
*Assistant Examiner*—James Pilkington
(74) *Attorney, Agent, or Firm*—Morrison & Foerster LLP

(57) ABSTRACT

A drive mechanism is interposed between two members to make the members move relatively with respect to each other. At least one of the two members is guided to move linearly. The drive mechanism comprises: cam followers that are rotatably supported on one of the two members, that are arranged in the linear moving direction, and that are spaced from each other; and a cam that is rotatably supported on the other one of the two members and that is provided in its circumference with a cam groove in which the cam followers engage, the rotation axis of the cam being arranged in the direction of the linear moving direction. The two members are made to move relatively with respect to each other by driving the cam to rotate and making the cam followers engage successively in the cam groove and move in the direction of the rotation axis.

8 Claims, 34 Drawing Sheets

U.S. PATENT DOCUMENTS

| | | | |
|---|---|---|---|
| 5,860,324 A * | 1/1999 | Parsons | 74/441 |
| 6,327,929 B1 * | 12/2001 | Yanagisawa | 74/490.09 |
| 6,584,867 B2 * | 7/2003 | Kennedy | 74/89.17 |
| 2001/0042417 A1 * | 11/2001 | Kennedy | 74/458 |

FOREIGN PATENT DOCUMENTS

| | | |
|---|---|---|
| EP | 0 620 080 | 10/1994 |
| GB | 1 477 821 | 4/1975 |
| GB | 1477821 A | 6/1977 |
| JP | 5-332415 | 12/1993 |
| JP | 10-009359 | 1/1998 |

OTHER PUBLICATIONS

Notice of Preliminary Rejection dated Sep. 12, 2005, directed to counterpart foreign application.

European Examination Report dated Aug. 30, 2004, issued in counterpart European Application No. 03256722.4.

* cited by examiner

A-A SECTION

VIEWED FROM DIRECTION A IN FIG.34
(REVOLVING PORTION)

DRIVE MECHANISM AND MOVABLE TABLE UNIT PROVIDED WITH THE SAME

CROSS-REFERENCE TO RELATED APPLICATIONS

The present application claims priority upon Japanese Patent Application No. 2002-309760 filed on Oct. 24, 2002, and Japanese Patent Application No. 2003-349888 filed on Oct. 8, 2003, which are herein incorporated by reference.

BACKGROUND OF THE INVENTION

1. Field of the Invention

The present invention relates to a drive mechanism interposed between two member guides for linear movement relative to each other to move the two members relative to each other, and a movable table unit provided with the drive mechanism.

2. Description of the Related Art

A movable table unit applied to a machine tool, such as a machining center, will be described with reference to FIGS. 20 and 21. FIG. 20 is a front elevation of a movable table unit 7 used in a machine tool, and FIG. 21 is a sectional view taken on line XXI-XXI in FIG. 20. The movable table unit 7 includes a table 3 that is for supporting a workpiece and that is mounted on a base 1 fixedly installed on the floor, and linear guide members 5 extended on the base 1 to guide the table 3 for linear movement on the base 1. Generally, a drive mechanism including a rack 101 and a pinion 103 or a drive mechanism using a ball screw is used for moving the table 3.

Referring to FIGS. 20 and 21, a drive mechanism includes a rack 101 fixed to the top surface of the base 1, and a pinion 103 rotatably supported on the table 3 and engaged with the rack 101. The pinion 103 is driven to rotate by a motor 105 and the like, and the teeth provided on the circumference of the pinion 103 are meshed with the linear teeth of the rack 101. According to this structure, the table 3 is made to move linearly. (Refer to, for example, "Kikai Kogaku Binran, New Edition", The Japan Society of Mechanical Engineers, B1-108, May 15, 1988.) The drive mechanism transmits force through the engagement of the teeth of the rack and the pinion. Therefore, a stress path, i.e., a path of force transmission from the table 3 to the base 1, is short and, hence the rigidity of the drive mechanism is high; that is, the force transmission path does not extend over the entire length of the rack 1, and the drive mechanism has high-rigidity.

Another drive mechanism will be described with reference to FIGS. 22 and 23.

FIG. 22 is a side elevation of a drive mechanism including a ball screw, and FIG. 23 is a partly cutaway perspective view of the drive mechanism shown in FIG. 22.

The drive mechanism includes a threaded rod 111 having axially opposite end journals 111a and 111b supported by bearings on a base 1, and a threaded nut 113 fastened to a table 3 and engaged with the threaded rod 111. The threaded nut 113 moves together with the table 3 along the threaded rod 111 when the threaded rod 111 rotates. As shown in FIG. 23, the threaded rod 111 is linked to the nut 113 by a plurality of balls 115 constrained in the space formed by helical grooves formed in the peripheral surface of the threaded rod 111 and the inner peripheral surface of the threaded nut 113. When the threaded rod 111 is driven for rotation, the balls 115 roll while bearing axial load, and the nut 113 is moved axially to move the table 3 linearly relative to the base 1. (Refer to, for example, "Kikai Kogaku Binran, New Edi-tion", The Japan Society of Mechanical Engineers, B2-173, Sep. 30, 1991.) In this drive mechanism, backlash between the threaded rod 111 and the threaded nut 113 can be reduced by axially pressurizing the balls 115 in advance to prevent play between the threaded rod 111 and the threaded nut 113. Therefore, the drive mechanism is able to position the table 3 accurately.

Those known drive mechanisms, however, have the following common problems.

(1) The stroke of the drive mechanism for the table 3 cannot easily be changed. The stroke for the table 3 moved by the former drive mechanism is dependent on the length of the rack 101, and that of the stroke for the table 3 moved by the latter drive mechanism is dependent on the length of the threaded rod 111. Thus, the stroke of the table 3 cannot easily be changed after the installation of the drive mechanism.

(2) The rack 101 needs to be replaced with a new one when a part of the teeth of the rack 101 is broken, and the threaded shaft 111 needs to be replaced with a new one when part of the thread of the threaded rod 111 is broken. Therefore, these drive mechanisms are poor in maintainability.

Further, those known drive mechanisms have the following individual problems.

(1) Although the former drive mechanism is satisfactory in rigidity, there is a backlash between the mating teeth of the rack 101 and the pinion 103. Inevitably, the backlash causes play between the rack 101 and the pinion 103, and hence the former drive mechanism is inferior to the latter drive mechanism in accuracy of positioning the table 3. Since the teeth of the rack 101 and the pinion 103 are in sliding contact and not in rolling contact, the teeth are liable to be abraded. Therefore, the drive mechanism is unsatisfactory in durability, and is also unable to operate quietly at high operating speeds.

(2) Although the latter drive mechanism is superior to the former in positioning accuracy, the stress path from the table 3 to the base 1 changes according to the stroke of the table 3. As shown in FIG. 22, force is transmitted from the table 3 to the base 1 through the threaded nut 113, the threaded rod 111 in engagement with the threaded nut 113, and the end journals 111a and 111b. Thus, the length of the stress path is dependent on the length of the threaded rod 111. Therefore, if the drive mechanism has a long stroke, the stress path is long and the rigidity of the drive mechanism is very low.

SUMMARY OF THE INVENTION

The present invention has been made in view of those problems mentioned above and it is therefore an object of the present invention to provide a drive mechanism in which the stroke of relative movement can readily be changed, that has substantially constant rigidity regardless of the stroke, and that is satisfactory in maintainability, durability, and quietness, and to provide a table unit using the drive mechanism. Another object of the present invention is to further provide a drive mechanism that is capable of suppressing play due to backlash and that has high positioning accuracy, and to provide a movable table unit using the drive mechanism.

An aspect of the present invention is a drive mechanism interposed between two members to make the two members move relatively with respect to each other, at least one of the two members being guided to move linearly in a linear moving direction. The drive mechanism comprises: a plurality of rolling cam followers that are rotatably supported on one of the two members, that are arranged in the linear moving direction, and that are spaced from each other; and a cam that is rotatably supported on the other one of the two members and that is provided in its circumference with a cam groove in which the rolling cam followers engage, the rotation axis of the cam being arranged in the direction of the linear moving direction; wherein the two members are made to move relatively with respect to each other by driving the cam to rotate and making the rolling cam followers engage successively in the cam groove and move in the direction of the rotation axis.

Features and objects of the present invention other than the above will become clear by reading the description of the present specification with reference to the accompanying drawings.

BRIEF DESCRIPTION OF THE DRAWINGS

For a more complete understanding of the present invention and the advantages thereof, reference is now made to the following description taken in conjunction with the accompanying drawings.

DETAILED DESCRIPTION OF THE INVENTION

Figure 1:
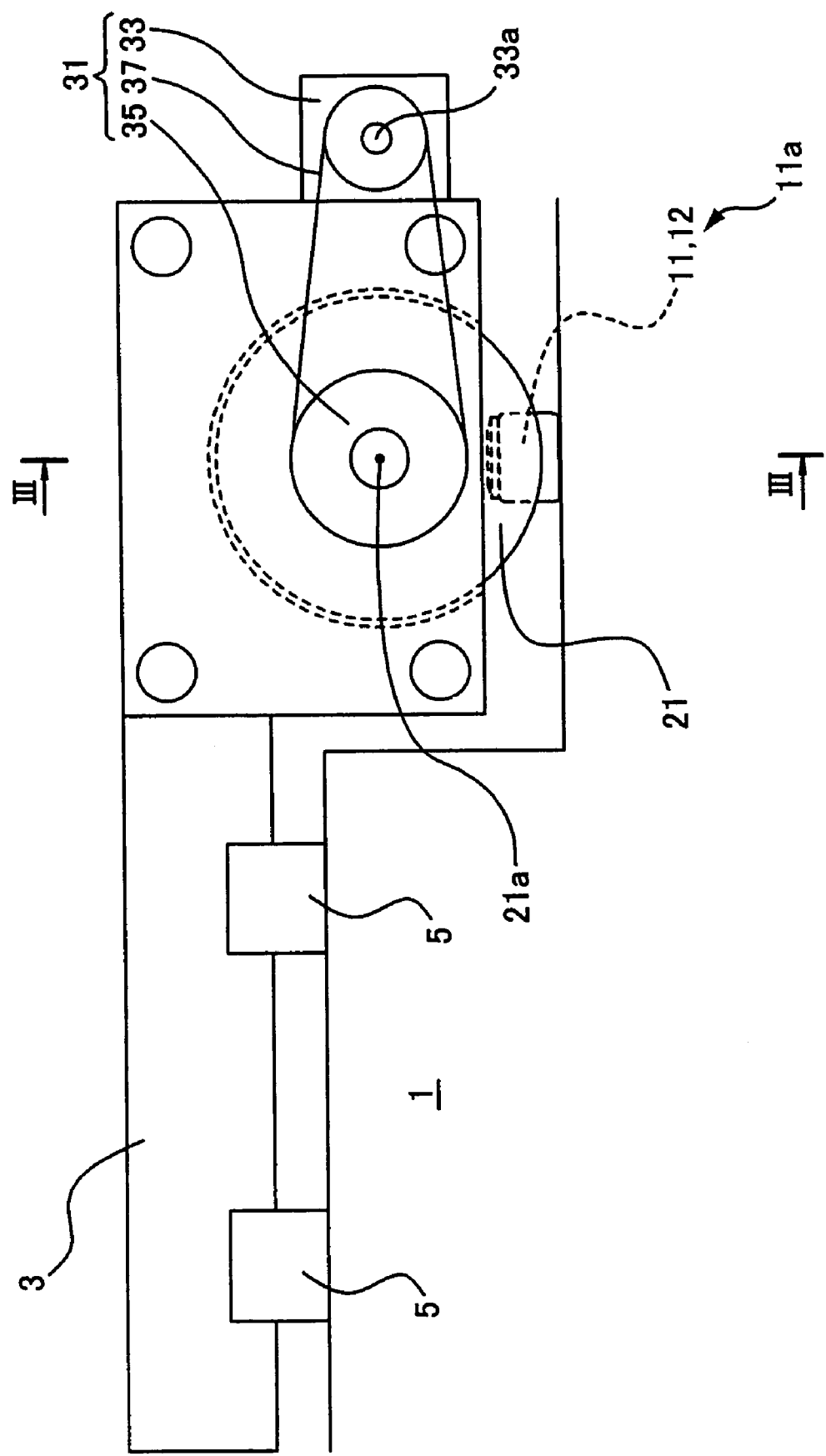
FIG. 1 is a front view of a drive mechanism in a first embodiment according to the present invention.

According to a first aspect of the present invention, a drive mechanism interposed between two members to make the two members move relatively with respect to each other, at least one of the two members being guided to move linearly in a linear moving direction, comprises: a plurality of rolling cam followers that are rotatably supported on one of the two members, that are arranged in the linear moving direction, and that are spaced from each other; and a cam that is rotatably supported on the other one of the two members and that is provided in its circumference with a cam groove in which the rolling cam followers engage, the rotation axis of the cam being arranged in the direction of the linear moving direction; wherein the two members are made to move relatively with respect to each other by driving the cam to rotate and making the rolling cam followers engage successively in the cam groove and move in the direction of the rotation axis.

When the cam supported on the other member is driven for rotation, the rolling cam followers supported on the first member engage successively in the cam groove of the circumference of the cam, and the two members move relative to each other along the rotation axis. After the cam follower has moved by a predetermined distance along the direction of the rotation axis, the next cam follower engages in the cam groove and rolls. Thus, the cam followers engage the cam groove successively, and move in a direction parallel to the rotation axis, and the cam and the cam followers move relative to each other. Consequently, the member supporting the cam followers and the member supporting the cam move linearly relative to each other. The relative stroke between the two members can readily be changed simply by changing the number of the cam followers. The relative stroke can be increased by arranging additional cam followers in the direction of relative movement and can be decreased by removing some of the cam followers.

If the cam followers do not operate properly, only the defective cam followers are replaced with new ones.

Therefore, maintainability of the drive mechanism is improved. The stress path of the drive mechanism starts from a part, in engagement with the cam follower, of the cam groove, extends axially across the cam, and terminates at a part supporting the cam. Therefore, the length of the stress path is dependent only on the length of the cam and is not dependent on length of the stroke, and hence the rigidity of the drive mechanism does not decrease even if the length of the stroke is increased.

Since the cam followers roll on the cam groove, that is, they are in rolling contact with the side surfaces of the cam groove, they are not liable to be abraded, are superior in durability, and are excellent in quietness during a high-speed operation.

Further, it is preferable that both ends, in the direction of the rotation axis, of the cam are supported rotatably; the cam groove is formed in the circumference of the cam throughout the length, in the direction of the rotation axis, of the cam; the cam groove is a helical groove oriented toward one direction in the circumferential direction of the cam; and before a cam follower that is engaged in the cam groove disengages from the cam groove, an adjacent cam follower engages in the cam groove.

Thus, simply by rotating the cam in one direction, the cam followers can be moved, relatively with respect to the cam, in only one direction that corresponds to the rotating direction of the cam and that is in the direction of the rotation axis.

Further, it is preferable that the length, in the direction of the rotation axis, of the cam is set shorter than a stroke of the linear movement of the member.

Since the length, in the direction of the rotation axis, of the cam is shorter than the stroke of relative movement, the stress path is short even if the stroke of relative movement is long, and hence the drive mechanism maintains high rigidity.

Further, it is preferable that the cam groove is defined by a pair of inner side surfaces opposing each other and a bottom surface connecting the side surfaces; and each of the cam followers rolls on at least one of the side surfaces.

Since the side surface of each cam follower comes into rolling contact with the side surface of the cam groove, the cam follower is able to engage securely in the cam groove.

Further, it is preferable that at least two cam followers engage in the cam groove simultaneously; one of at least two of these cam followers rolls on one of the pair of inner side surfaces; and another one of the at least two of these cam followers rolls on the other one of the pair of inner side surfaces.

In this structure, at least two cam followers, among the cam followers that are simultaneously engaged in the cam groove, roll on the opposite side surfaces of the cam groove, respectively. In this way, the two cam followers suppress axial play between the cam and the cam followers even if there is a backlash between the circumference of the cam followers and the cam groove, i.e., even if the width of the cam groove is greater than the diameter of the cam followers.

Further, it is preferable that a plurality of the cam followers are arranged in the linear moving direction to form a cam follower row; and at least two of these cam follower rows are aligned next to each other in the linear moving direction.

The plurality of cam follower rows makes sure that the cam and cam followers are engaged securely. Since the load is distributed among the cam followers, the durability of the drive mechanism is improved.

Further, it is preferable that the cam groove is defined by a pair of inner side surfaces opposing each other and a bottom surface connecting the side surfaces; each of the cam followers rolls on at least one of the side surfaces; all the cam followers belonging to a certain cam follower row roll on either one of the pair of side surfaces of the cam groove; all the cam followers belonging to one of at least two of the cam follower rows roll on one of the pair of side surfaces; and all the cam followers belonging to another one of the at least two of the cam follower rows roll on the other one of the pair of side surfaces.

Since the respective cam followers of at least the two cam follower rows roll on the opposite side surfaces of the cam groove, respectively, the cam followers of the two cam follower rows suppress axial play between the cam and the cam followers even if there is a backlash between the circumference of the cam followers and the cam groove.

Further, it is preferable that the cam groove is a tapered groove in which the width of the groove narrows toward the bottom in depth; and the cam follower has a tapered cylindrical shape conforming to the tapered groove.

Thus, the pressing force of the cam followers against the side surfaces of the cam groove of the cylindrical cam can be adjusted simply by adjusting the distance between the cam follower row and the rotation axis of the cam in order to ensure that the cam followers roll on the side surfaces of the cam groove.

Another aspect of the present invention is a movable table unit that comprises the above-mentioned drive mechanism. In this movable table unit, one of the two members that rotatably supports the cam followers is a base fixedly installed on a floor; and the other one of the two members that rotatably supports the cam is a table supported on the base to move linearly and relatively with respect to the base.

According to this invention, the stroke of the table moving relative to the base is freely adjustable, and the table unit is superior in maintainability and has high rigidity.

Another aspect of the present invention is a movable table unit that comprises a plurality of the movable table units described above. The plurality of movable table units are stacked in multiple layers so that the movable table units move with respect to each other in different directions.

In this way, the table located farthest from the base that is fixed to the floor can be moved in a plurality of different directions. Therefore, it is possible to provide a movable table unit having a high degree of freedom in movement of the tables.

Hereinbelow, embodiments of the present invention will be described in detail with reference to the attached figures.

FIRST EMBODIMENT

Figure 2:
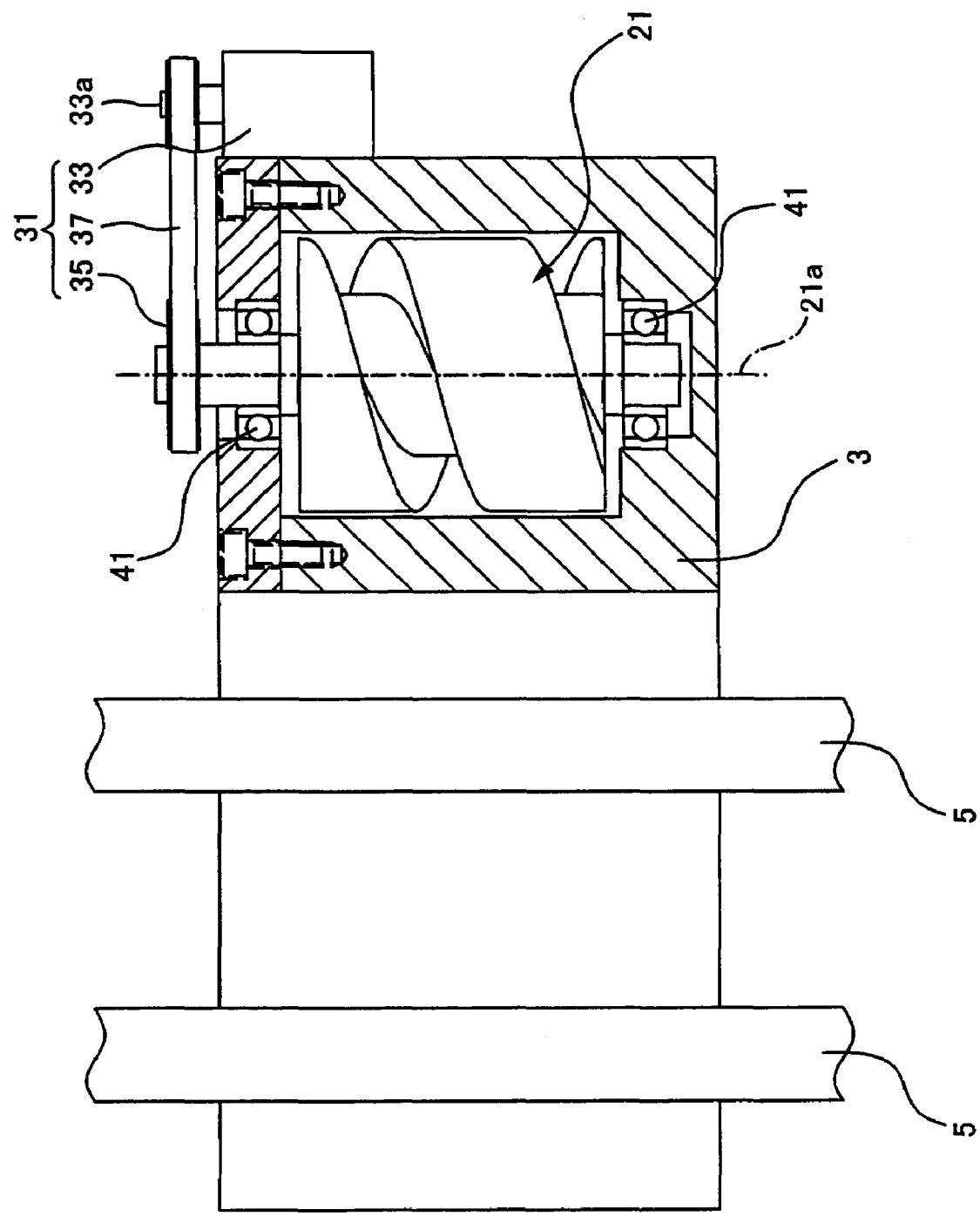
FIG. 2 is a bottom view of the drive mechanism shown in FIG. 1.
Figure 3A:
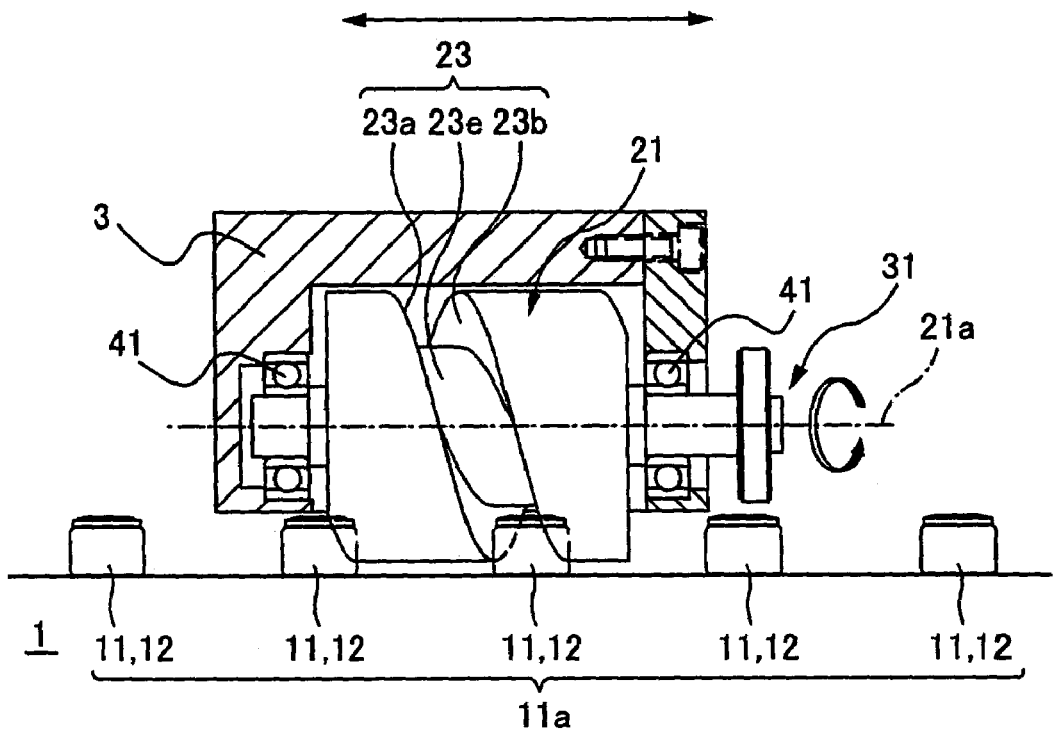
FIG. 3A is a sectional view taken on line III-III in FIG. 1 showing the drive mechanism moving a moving member.
Figure 3B:
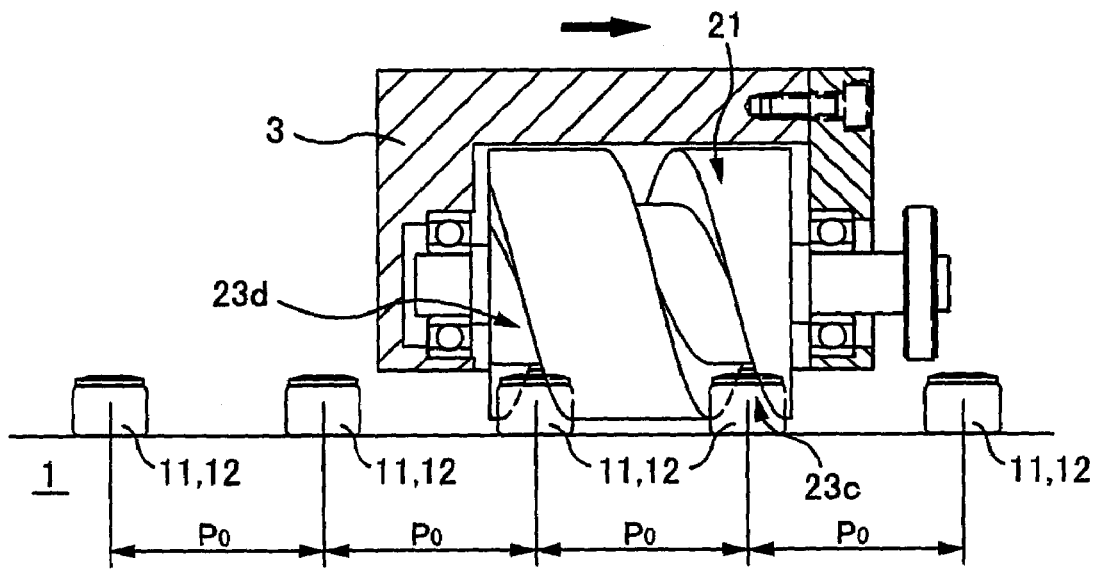
FIG. 3B is a sectional view taken on line III-III in FIG. 1 showing the drive.

FIG. 1 is a front view of a drive mechanism in a first embodiment according to the present invention, and FIG. 2 is a bottom view that is partially broken of the drive mechanism shown in FIG. 1. FIGS. 3A and 3B are sectional views taken on line III-III in FIG. 1 showing the drive mechanism moving a moving member. Note that, the cam followers and the circumference of the cylindrical cam of FIGS. 3A and 3B are not cross sectional views but side views.

The drive mechanism according to this invention is interposed between a first member 1 and a second member 3, at least one of which being guided to move linearly in a linear moving direction, in order to make the first and second members 1, 3 move relatively with respect to each other. In the first embodiment, the first member 1 is a base 1 installed on the floor with a horizontal top surface, and the second member 3 is a movable member 3 mounted on the base 1 and guided by a pair of straight guide rails 5 for linear movement.

In the present embodiment, a cam mechanism is adopted as the drive mechanism for linearly moving the movable member 3 relative to the base 1. Referring to FIGS. 1 and 3, the drive mechanism includes a plurality of cam followers 11 arranged on the top surface of the base 1 at equal pitches P0 in the direction of linear movement of the movable member 3, and a cylindrical cam 21 supported for rotation on the movable member 3 with its axis 21a of rotation extended in the linear moving direction. The cylindrical cam 21 is provided with a cam groove 23 in its circumference. The cam followers 11 engage in the cam groove 23. A drive source 31 fixed on the movable member 3 drives the cylindrical cam 21 for rotation. When the cylindrical cam 21 is rotated, the cam followers 11 come successively into engagement with the cam groove 23 and move in the direction of the axis 21a of the cylindrical cam 21 relative to the cylindrical cam 21 and, consequently, the movable member 3 moves in the linear moving direction.

Each cam follower 11 is of a known construction having a cam stud, which serves as an axis of rotation for rolling (also called rolling axis), a needle bearing mounted on one end of the cam stud, and a cylindrical cam roll 12 supported on the cam stud by the needle bearing.

The cam stud is threaded on the other end. The threaded part of the cam stud is screwed in a threaded hole formed in the top surface of the base 1 to set up the cam follower 11 on the top surface of the base 1. The cam roll 12 is able to rotate about the rolling axis.

The plurality of cam followers 11 are arranged in a straight line with their rolling axes extended parallel to each other, thus forming a cam follower row 11a in the linear moving direction. As shown in FIG. 1, the rolling axes of the cam followers 11, perpendicularly intersect the axis 21a of rotation of the cylindrical cam 21.

Referring to FIGS. 3A and 3B, the cylindrical cam 21 is a substantially circular cylinder. Both ends of the cylindrical cam 21 are rotatably supported on the movable member 3 by bearing members 41, such as ball bearings. The circumference of the cylindrical cam 21 is set shorter than the length of the cam follower row 11a. As shown in FIG. 1, the axis 21a of rotation is arranged right above and parallel to the cam follower row 11a so that the rotation axis 21a is in the linear moving direction. Accordingly, the circumference of the cylindrical cam 21 faces the cam follower row 11a. The cam groove 23 is formed in the circumference of the cylindrical cam 21. The cam followers 11 engage successively in the cam groove 23 as the cylindrical cam 21 rotates.

Referring to FIGS. 3A and 3B, the cam groove 23 is defined by a pair of opposite side surfaces 23a and 23b, and a bottom surface 23e connecting the side surfaces 23a and 23b. The side surfaces 23a and 23b function as the cam surfaces on which the cam followers 11 roll. The cam roll 12 of each cam follower 11 rolls on either the side surface 23a or the side surface 23b. The side surfaces 23a and 23b are formed so as to conform to the shape of the circumference of the cam roll 12 of the cam follower 11 in order to make the cam roll 12 abut against the surfaces 23a and 23b evenly along the direction of its rolling axis. Since the cam rolls 12 in the first embodiment are cylindrical, the side surfaces 23a and 23b are formed in the direction of the axes of the cam followers 11. Therefore, the width of the cam groove 23, i.e., the distance between the pair of the side surfaces 23a and 23b, is constant along the entire depth of the cam groove 23.

The cam groove 23 is a helical groove twisted in one direction along a circumferential direction of the cylindrical cam 21. As shown in FIG. 3B, the helical cam groove 23 is formed to extend continuously between the opposite axial ends of the cylindrical cam 21. The cam groove 23 has a front guide part 23c for guiding the cam followers 11 into the cam groove 23 and a back guide part 23d for guiding the cam followers 11 out of the cam groove 23. The front guide part 23c and the back guide part 23d are respectively provided at opposite ends of the cam groove 23. When the cylindrical cam 21 rotates in the direction of the arrow indicated as in FIG. 3A, the cam groove 23 moves the cam follower 11 to the left relative to the movable member 3 to the other end of the cam groove, i.e., the movable member 3 moves in the direction of the arrow indicated in FIG. 3B. As the cam follower 11 approaches the back guide part 23d, the next cam follower 11 is guided into the cam groove 23 by the front guide part 23c and starts moving in the cam groove 23 before the preceding cam follower 11 separates from the back guide part 23d. Thus, the cam followers 11 are moved successively to the left relative to the cylindrical cam 21. Actually, the movable member 3 rotatably supporting the cylindrical cam 21 moves straight in the direction of the arrow indicated in FIG. 3B because the cam studs of the cam followers 11 are fixed to the base 1.

Basically, only one of the cam followers 11 engages the cam groove 23 in the drive mechanism in the first embodiment; as shown in FIG. 3B, however, two cam followers 11 are engaged in the cam groove 23 only at a stage when the preceding cam follower 11 is about to separate from the back guide part 23d and the succeeding cam follower 11 is guided by the front guide part 23c into the cam groove 23.

The shape of the cam groove 23 of the cylindrical cam 21 is designed according to a desired mode of movement of the movable member 3. For example, when it is desired to move the movable member 3 at a constant linear speed by rotating the cylindrical cam 21 at a constant rotating speed, the cam groove 23 is formed in the shape of a uniform helix having a fixed helix angle. When it is desired to move the movable member 3 intermittently, that is, when it is desired to make the movable member 3 move and stop repetitively, by rotating the cylindrical cam 21 at a constant rotating speed, a groove whose shape is such that the position in the direction of the rotation axis 21a does not change even when the cam 21 is rotated may be provided in a predetermined position of the cam groove 23.

Referring to FIGS. 1 and 2, the drive source 31 for driving the cylindrical cam 21 for rotation is a belt drive mechanism 31. This belt drive mechanism 31 includes a motor 33 fixedly mounted on the movable member 3, a driven pulley 35 that is fixedly mounted on one end of the cylindrical cam 21 and that is concentric with the rotation axis 21a, and an endless belt 37 extended between the driven pulley 35 and an output shaft 33a of the motor 33. The rotative force of the motor 33 is transmitted to the driven pulley 35 by the endless belt 37 so as to rotate the cylindrical cam 21.

The effect of the drive mechanism in the first embodiment of this invention will be described with reference to FIGS. 3A and 3B.

The drive mechanism has an advantage in readily changing the stroke of the movable member 3. That is, the length of the stroke can be easily changed by simply changing the number of the cam followers 11 provided in the linear moving direction. For example, the stroke can be extended by adding cam followers 11 in the linear moving direction or can be shortened by removing some of the cam followers 11 of the cam follower row.

The drive mechanism is also excellent in maintainability. If a defective cam follower 11 is found, only the defective cam follower 11 needs to be replaced with a new one.

The drive mechanism is capable of maintaining high rigidity even if the stroke is long. The stress path of the drive mechanism (i.e., the force transmission path between the base 1 and the movable member 3) starts from a part of the cam groove 23 that comes in contact with the cam follower 11, extends axially through the cylindrical cam 21, and terminates at the part of the cylindrical cam 21 that is supported by the roller bearing 41,. Thus, the length of the stress path is not dependent on the stroke and is dependent only on the cylindrical cam 21 itself. Therefore, the drive mechanism is able to maintain high rigidity even if the stroke is long as shown in FIGS. 3A and 3B.

The drive mechanism is satisfactory in durability and quietness. This is because the cam followers 11 are in rolling contact with the cam groove 23, and therefore, the cam followers 11 and the cam groove 23 are not abraded easily and do not generate large noise.

SECOND EMBODIMENT

Figure 4A:
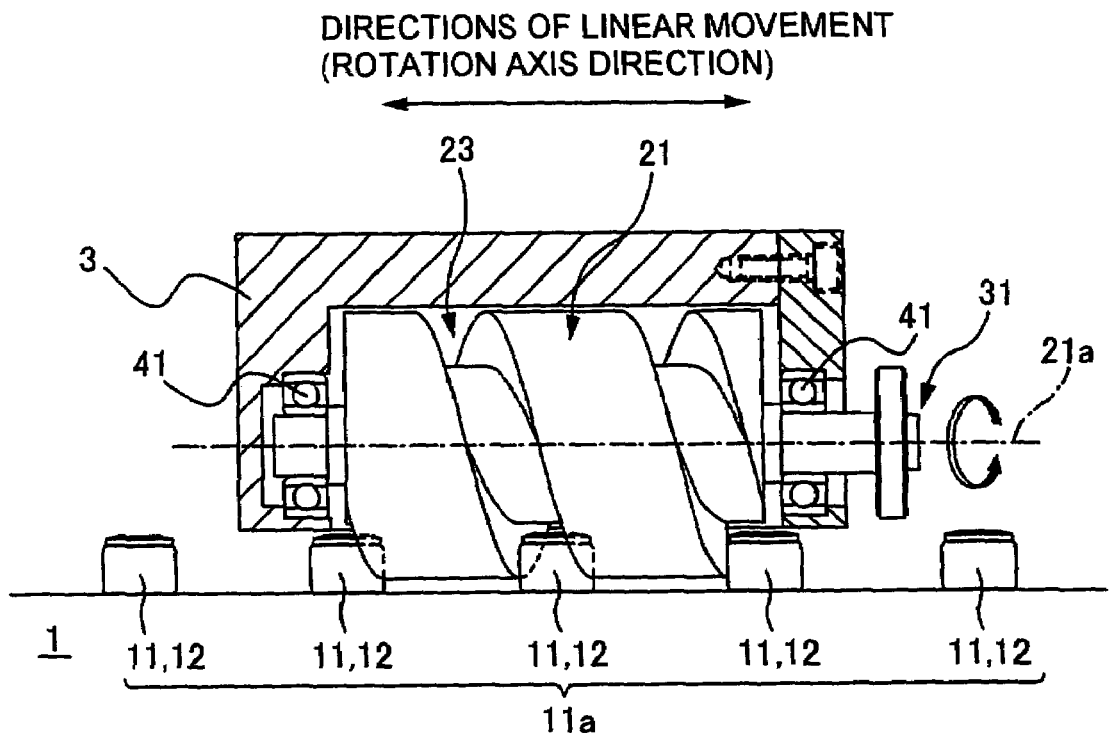
FIG. 4A is a sectional view of a drive mechanism in a second embodiment according to the present invention showing the drive mechanism moving the moving member.
Figure 4B:
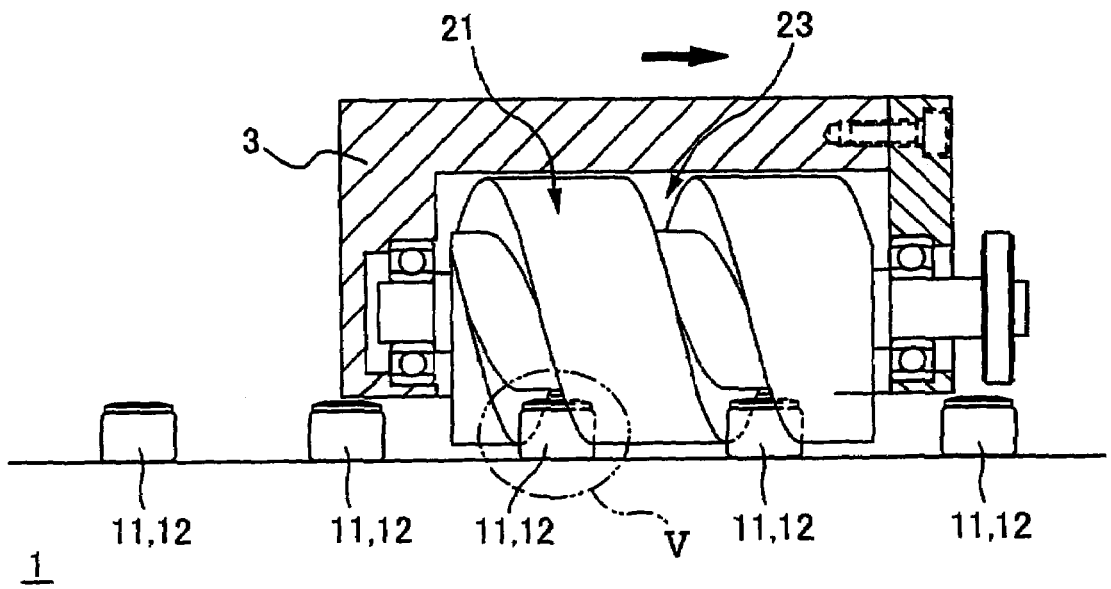
FIG. 4B is a sectional view of a drive mechanism in a second embodiment according to the present invention showing the drive mechanism moving the moving member.
Figure 5:
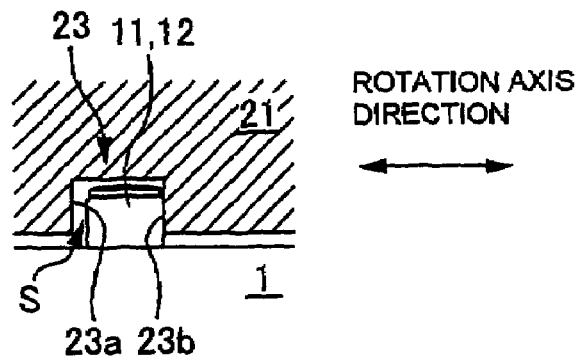
FIG. 5 is a view of a part V in FIG. 4B.

Sectional views of a drive mechanism moving a movable member 3 in a second embodiment according to the present invention is shown in FIGS. 4A and 4B, which are similar to FIGS. 3A and 3B. FIG. 5 shows a part V in FIG. 4B. FIGS. 6A, 6B and FIGS. 7A through 7D are views specifically explaining the drive mechanism in the second embodiment in which backlash is suppressed. In FIG. 5 and FIGS. 7A through 7D, a sectional view of the cylindrical cam 21 taken at its center is shown in order to clearly show how the cam followers 11 and the cam groove 23 contact with each other. Structural components corresponding to those of the drive mechanism in the first embodiment are denoted by the same reference characters and the description thereof will be omitted.

While the drive mechanism in the first embodiment is of a one-point drive system in which basically only one of the cam followers 11 engages the cam groove 23, the drive mechanism in the second embodiment is of a two-point drive system in which basically two cam followers 11 engage the cam groove 23 simultaneously.

The two-point drive system is able to improve accuracy in positioning the movable member 3 by suppressing play due to backlash between the cam groove 23 and the cam followers 11. The backlash will be explained with reference to FIG. 5. A gap (backlash) S between the side surface 23a of the cam groove 23 and the cam roll 12 of the cam follower 11 is formed because the width of the cam groove 23 is greater than the outside diameter of the cam roll 12 of the cam follower 11. Basically, the cam follower 11 rolls on the side surface 23b, and the backlash S is formed between the other side surface 23a of the cam groove 23 and the cam follower 11. The backlash S causes axial play between the cylindrical cam 21 and the cam follower 11, and as a result, accuracy in positioning the movable member 3 is deteriorated.

As shown in FIGS. 6A, 6B and FIGS. 7A through 7D, the cylindrical cam 21 and the cam followers 11 of the drive mechanism in the second embodiment are designed to suppress play due to the backlash S., and arranged such that two cam followers 11 engage simultaneously in the cam groove 23, with one of the two cam followers 11 in contact with the opposite side surfaces 23a and 23b of the cam groove 23, respectively.

Such engagement of the two cam followers 11 in the cam groove 23 can be achieved by a first method in which the pitches between the cam followers 11 are appropriately adjusted or a second method in which the helical shape of the cam groove 23 is appropriately adjusted.

<First Method>

The first method will be described on an assumption that the cam groove 23 has the shape of a uniform helix having a fixed helix angle. The cam followers 11 are not arranged in a cam follower row 11a at equal pitches; the cam followers 11 are arranged at alternate long pitches P1 and short pitches P2. The long pitches P1 are set greater than the short pitches P2 by a length twice as large as the backlash S.

Figure 6A:
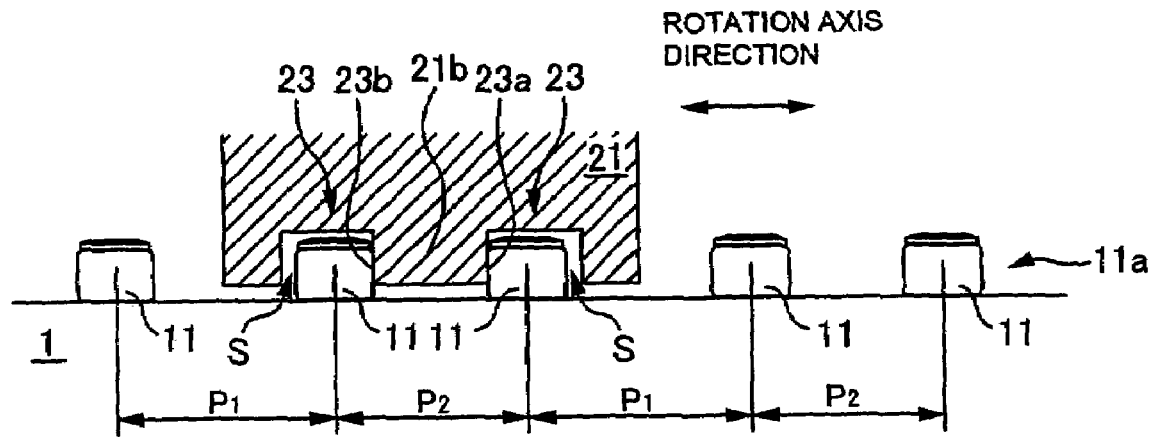
FIG. 6A is a diagrammatic view of assistance in concretely explaining the drive mechanism in the second embodiment.

In this way, while two adjacent cam followers 11, namely, first and second cam followers 11, spaced at the short pitch P2 are in engagement with the cam groove 23 to roll as shown in FIG. 6A, the portions of the circumferences of each cam follower 11 that face the other cam follower 11 are in contact with the opposite side surfaces 23a and 23b, respectively. Consequently, a part 21b of the cylindrical cam 21 between the adjacent cam followers 11 is held between the adjacent first and the second cam followers 11, and thereby the cylindrical cam 21 is restrained from moving freely in the axial direction.

Figure 6B:
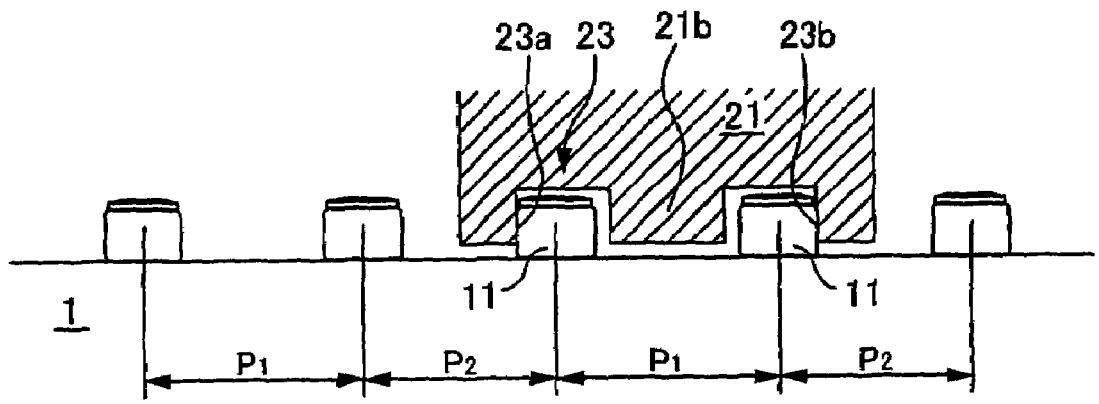
FIG. 6B is a diagrammatic view of assistance in concretely explaining the drive mechanism in the second embodiment.

As the cylindrical cam 21 rotates further, the first and the second cam followers 11 move toward the back guide part 23*d* relative to the cylindrical cam 21. In this state, the first cam follower 11, namely the preceding cam follower 11, separates from the back guide part 23*d*, and the second cam follower 11, namely, the succeeding cam follower 11, still remains in the cam groove 23. At this stage, a third cam follower 11, namely, the next cam follower 11 following the second cam follower remaining in the cam groove 23, is guided by the front guide part 23*c* into the cam groove 23 as shown in FIG. 6B. The second and the third cam followers 11 are spaced at the long pitch P1. Consequently, the third cam follower 11 comes into contact with the side surface 23*b* opposite the side surface 23*a* with which the second cam follower 11 is in contact, and tensile force acts on the part 21*b*, between the second and the third cam follower 11, of the cylindrical cam 21. Accordingly, the cylindrical cam 21 is restrained from moving freely in the axial direction.

As the cylindrical cam 21 rotates further, the above-mentioned motion is repeated and the following cam followers 11 engage successively in the cam groove 23. In this way, the movable member 3 is moved while the cylindrical cam 21 is restrained from moving freely in the axial direction.

<Second Method>

The second method will be described on an assumption that the cam followers 11 are arranged at equal pitches P0 in a cam follower row 11*a*.

Figure 7A:
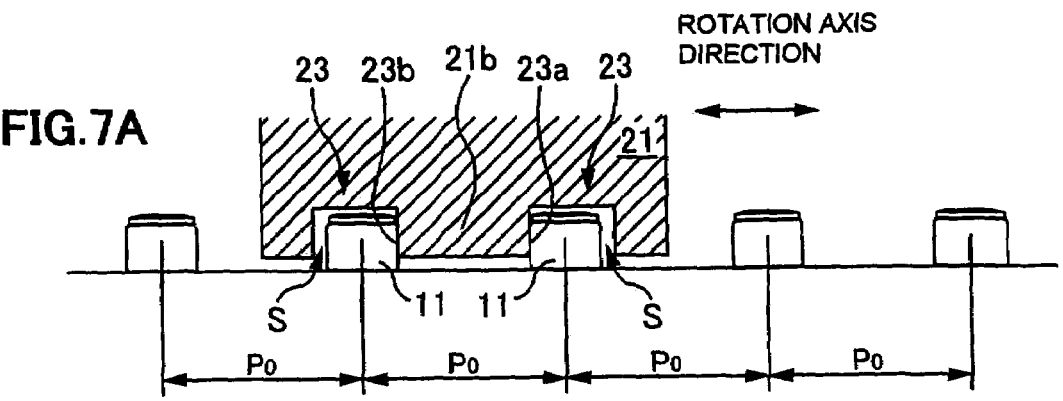
FIG. 7A is a diagrammatic view of assistance in concretely explaining the drive mechanism in the second embodiment.

The linear movement of the drive mechanism will be described with reference to FIGS. 7A to D. Referring to FIG. 7A, the two adjacent cam followers 11, namely, first and second cam followers 11, engage the cam groove 23 with the portions of the circumferences of each cam follower 11 that face the other cam follower 11 placed in contact with the opposite side surfaces 23*b* and 23*a*, respectively. A part 21*b*, between the side surfaces 23*a* and 23*b*, of the cylindrical cam 21 is held between the first and the second cam followers 11, and thereby the cylindrical cam 21 is restrained from moving freely in the axial direction. As the cylindrical cam 21 rotates, the first and the second cam followers 11 move toward the back guide part 23*d* of the cam groove 23. Actually, the cylindrical cam 21 moves linearly relative to the cam followers 11. Finally, as shown in FIG. 7D, the first cam follower 11 separates from the back guide part 23*d* and instead a third cam follower 11, namely, the cam follower following the second cam follower 11, is guided by the front guide part 23*c* into the cam groove 23, and in this way, the cylindrical cam 21 moves linearly for one stroke. At this stage, the part 21*b* of the cylindrical cam 21 is held between the second cam follower 11 remaining in the cam groove 23 and the third cam follower 11 newly engaged in the cam groove 23, to restrain the cylindrical cam 21 from moving freely in the axial direction.

To hold the part 21*b* between the second cam follower 11, which is remaining in the cam groove 23 and which is in contact with the side surface 23*a* (left side surface in the figure) as shown in FIG. 7A, and the third cam follower 11, the second cam follower 11 must be brought into contact with the other side surface 23*b* (right side surface in the figure) as shown in FIG. 7D. In a transient state where the second cam follower 11 is separated from the side surface 23*a* and brought into contact with the other side surface 23*b*, the second cam follower 11 has to be separated from the side surface 23*a*, and hence, the free axial motion of the cylindrical cam 21 caused by the backlash S becomes significant.

Figure 7B:
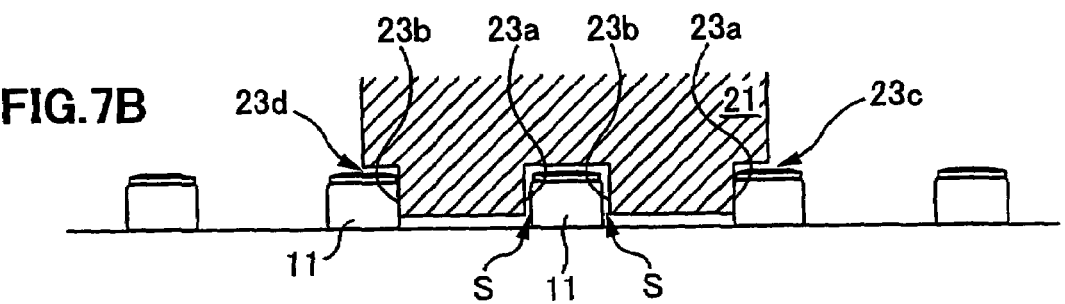
FIG. 7B is a diagrammatic view of assistance in concretely explaining the drive mechanism in the second embodiment.
Figure 7C:
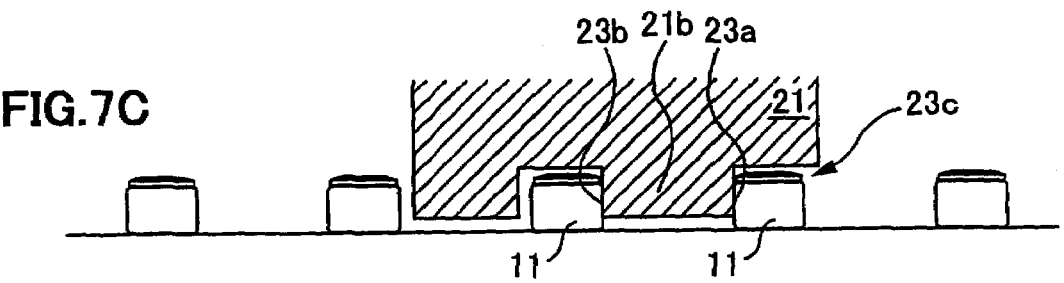
FIG. 7C is a diagrammatic view of assistance in concretely explaining the drive mechanism in the second embodiment.
Figure 7D:
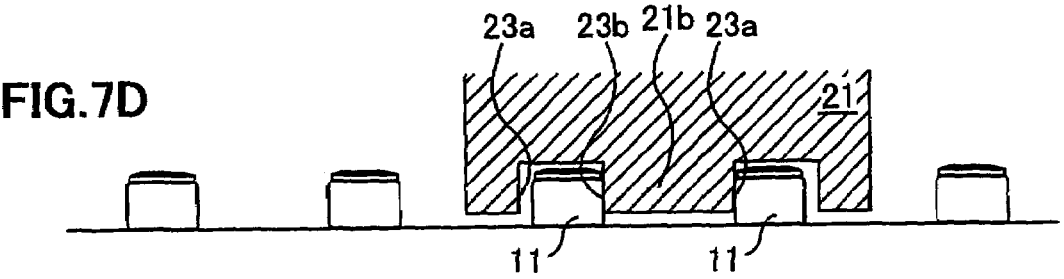
FIG. 7D is a diagrammatic view of assistance in concretely explaining the drive mechanism in the second embodiment.

In the second method, to prevent such free axial motion of the cylindrical cam 21 in the transient state, as shown in FIG. 7B, the cylindrical cam 21 is held between the first cam follower 11 about to separate from the back guide part 23*d* and the third cam follower 11 newly engaged in the cam groove 23. In the transient state, the parts, that oppose each other, of the circumferences of the first and the third cam followers 11 are in contact with the opposite side surfaces 23*b* and 23*a*, respectively, to restrain the cylindrical cam 21 from moving freely in the axial direction. As shown in FIG. 7C, after the second cam follower completes the transfer, the parts, opposing each other, of the second cam follower 11 having completed the transfer and the third cam follower 11 placed at the front guide part 23*c* come in contact with the opposite side surfaces 23*a*, 23*b*, respectively, to hold the part 21*b* of the cylindrical cam 21, restraining the cylindrical cam 21 from moving freely in the axial direction.

Transferring of the second cam follower 11 from one of the side surfaces 23*a* and 23*b* to the other, and holding the cylindrical cam 21 between the first cam follower 11 at the back guide part 23*d* and the third cam follower at the front guide part 23*c* are achieved by properly designing the helical shape of the cam groove 23.

MODIFICATION OF THE SECOND EMBODIMENT

Figure 8:
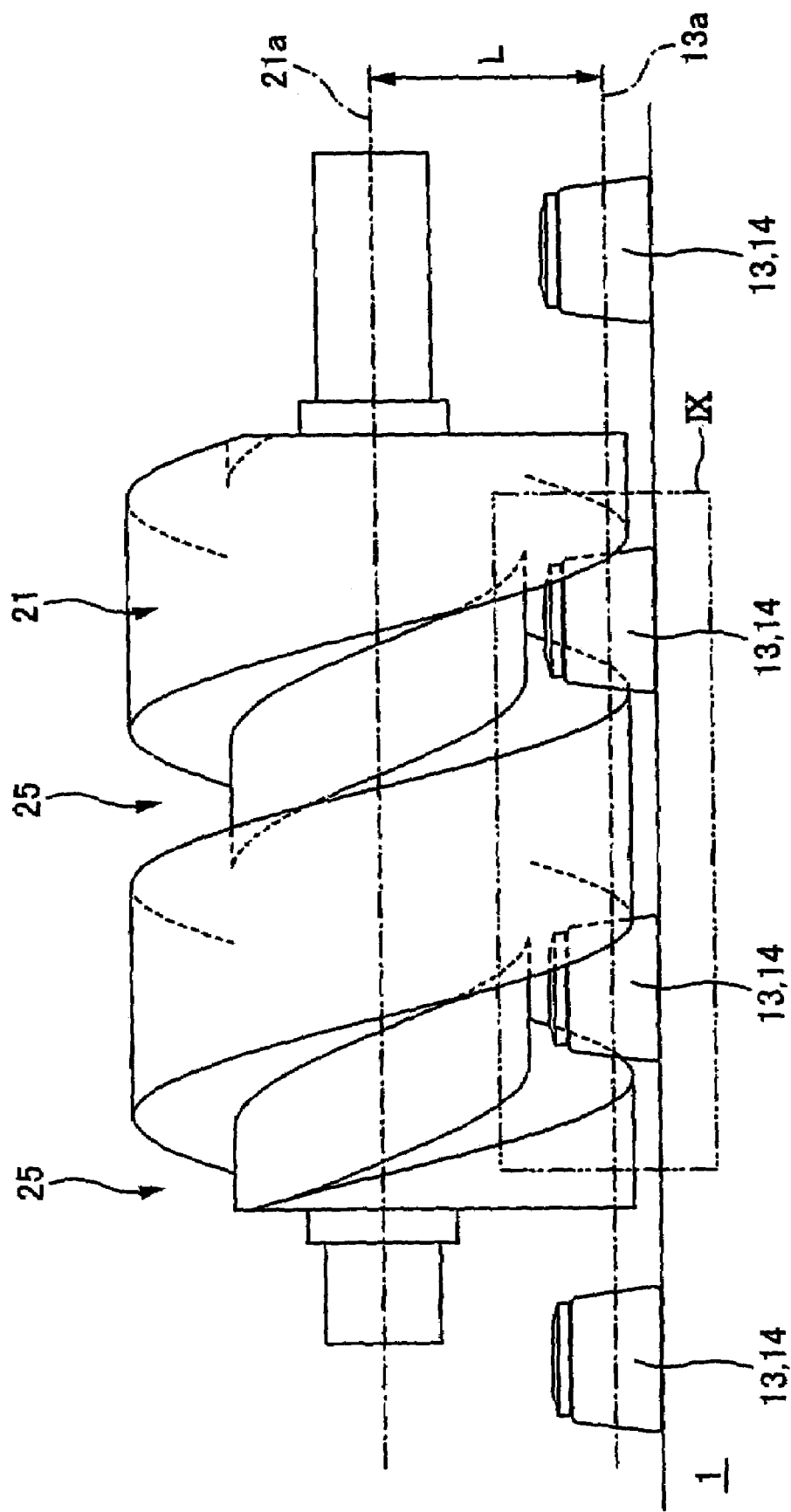
FIG. 8 is a fragmentary view of a drive mechanism in a modification of the drive mechanism in the second embodiment.
Figure 9:
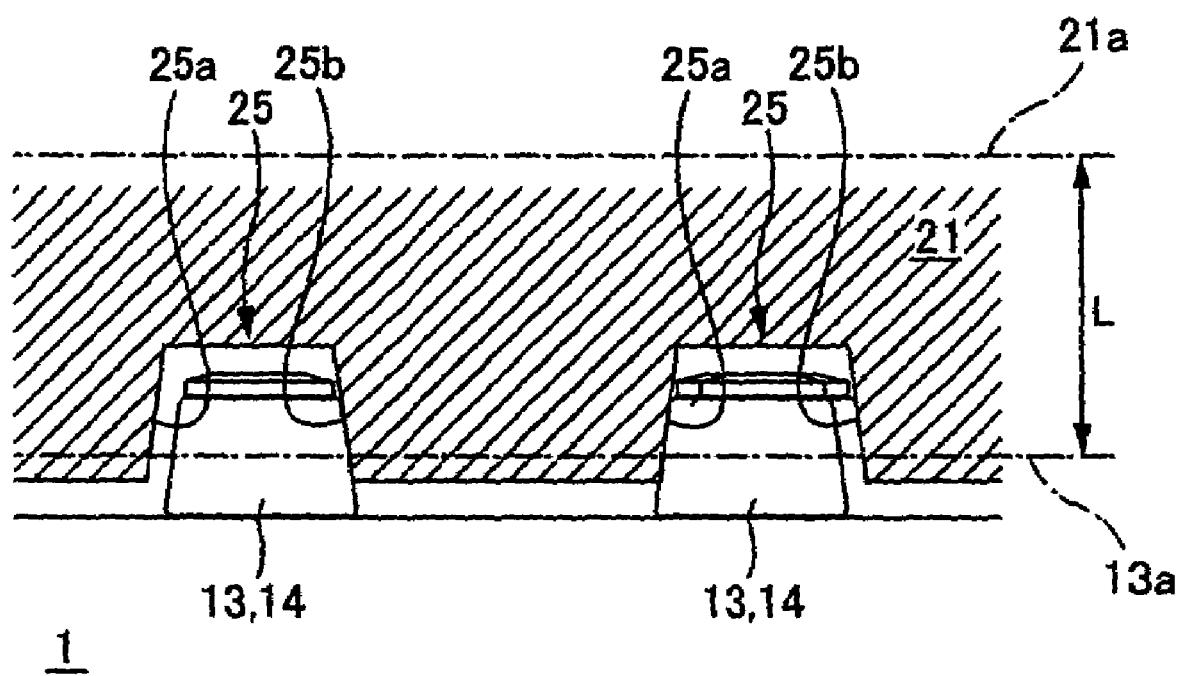
FIG. 9 is an enlarged view of a part IX in FIG. 8.

FIG. 8 shows a drive mechanism in a modification of the drive mechanism in the second embodiment. FIG. 9 shows a part IX in FIG. 8. In FIG. 9, a sectional view of the cylindrical cam 21 taken at it s center is shown in order to clearly show how cam followers 13 included in the drive mechanism and a cam groove 25 formed in the cylindrical cam 21 contact with each other. In FIGS. 8 and 9, structural components corresponding to those of the second embodiment are denoted by the same reference characters and the description thereof will be omitted.

In the drive mechanism in the second embodiment, the cam rolls 12 of the cam followers 11 are cylindrical, and hence the width of the cam groove 23, i.e., the distance between the side surfaces 23*a* and 23*b*, is constant over the depth of the cam groove 23. However, in this modification, cam rolls 14 of the cam followers 13 are cylindrical rolls having the shape of a taper cylinder tapering toward the tip end in the direction of the rolling axis of each cam follower 13. Further, the cylindrical cam 21 is provided with a cam groove 25 tapered toward the bottom to follow the circumference of the cam roll 14. As shown in FIG. 9, the side surfaces 25*a* and 25*b* of the tapered cam groove 25 are inclined at an angle corresponding to the taper of the cam roll 14, so that the cam roll 14 is able to contact evenly with the side surface 25*a* or 25*b* in the direction of the rolling axis of the cam follower.

When the cam groove 25 of the cylindrical cam 21 and the cam rolls 14 of the cam followers 13 are thus formed, the pressing force of two cam followers 14, which roll in the cam groove 25 at the same time, against the side surfaces 25*a* and 25*b* of the cylindrical cam 21 can easily be adjusted by adjusting the distance L between the rotation axis 21*a* of the cylindrical cam 21 and a cam follower row 13*a* formed by arranging the cam followers 13. More specifically, the distance L is decreased to increase the pressing force, and the distance L is increased to decrease the pressing force. Thus, the force is properly adjusted to make the cam followers 13 roll smoothly on the side surfaces 25*a* and 25*b*. Consequently, it is possible to effectively prevent the pitching etc. due to the slip of circumferences of the cam rolls 14 and the side surfaces 25*a* and 25*b* relative to each other.

THIRD EMBODIMENT

While the drive mechanisms in the first and the second embodiment are provided with the cam followers 11 arranged in the single cam follower row 11a, a drive mechanism in the third embodiment is provided with cam followers 11 arranged in two cam follower rows 11a. More specifically, two cam follower rows 11a and 11b extend parallel to each other in the linear moving direction of the movable member 3, as shown in FIGS. 10 to 15.

FIGS. 10 to 15 show different ways of arranging the two cam follower rows, respectively in FIGS. 10 to 15, structural components corresponding to those of the first and second embodiments are denoted by the same reference characters and the description thereof will be omitted.

Angular Arrangement of Cam Follower Rows about Cylindrical Cam

Figure 10:
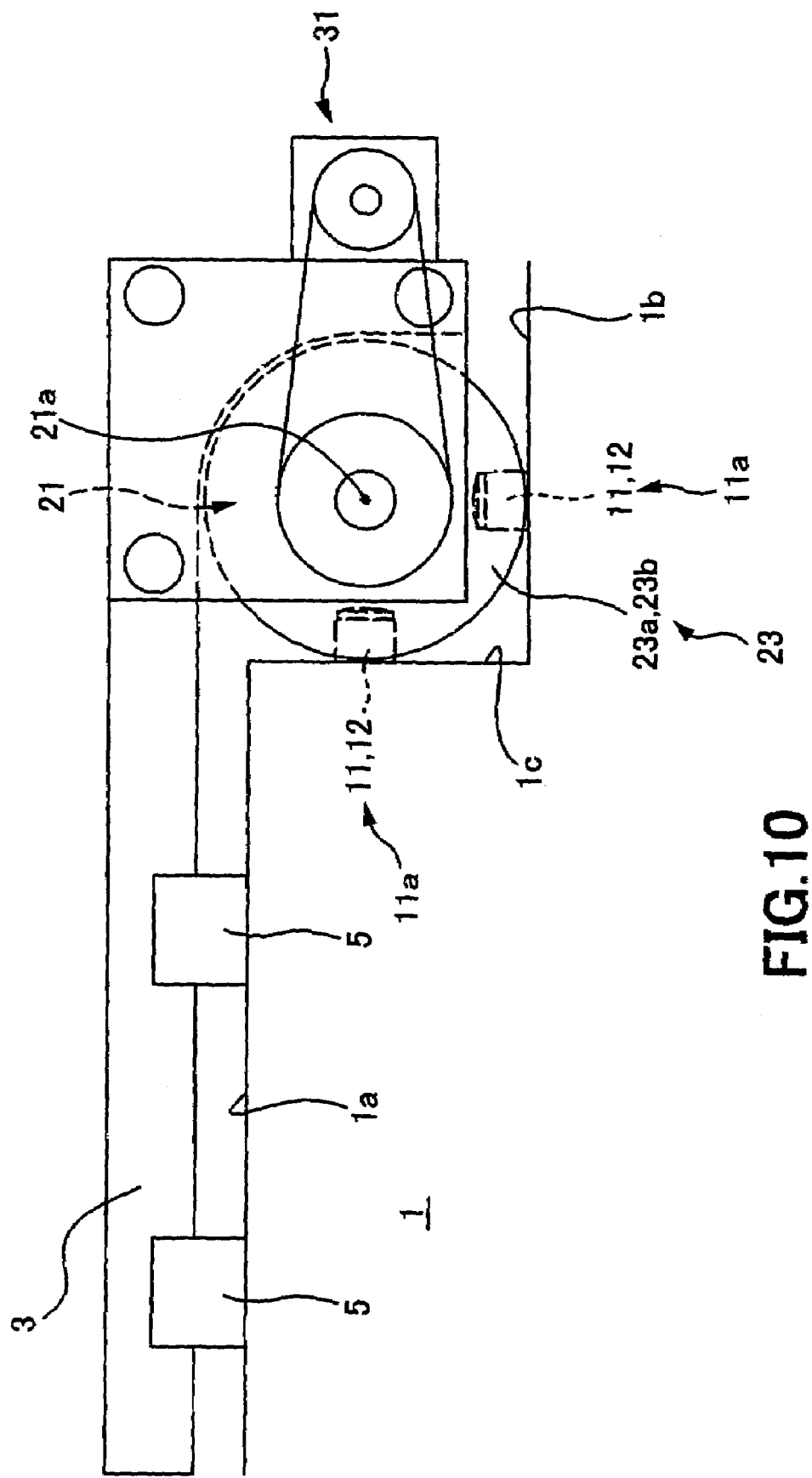
FIG. 10 is a front elevation of a drive mechanism in a third embodiment according to the present invention.
Figure 11:
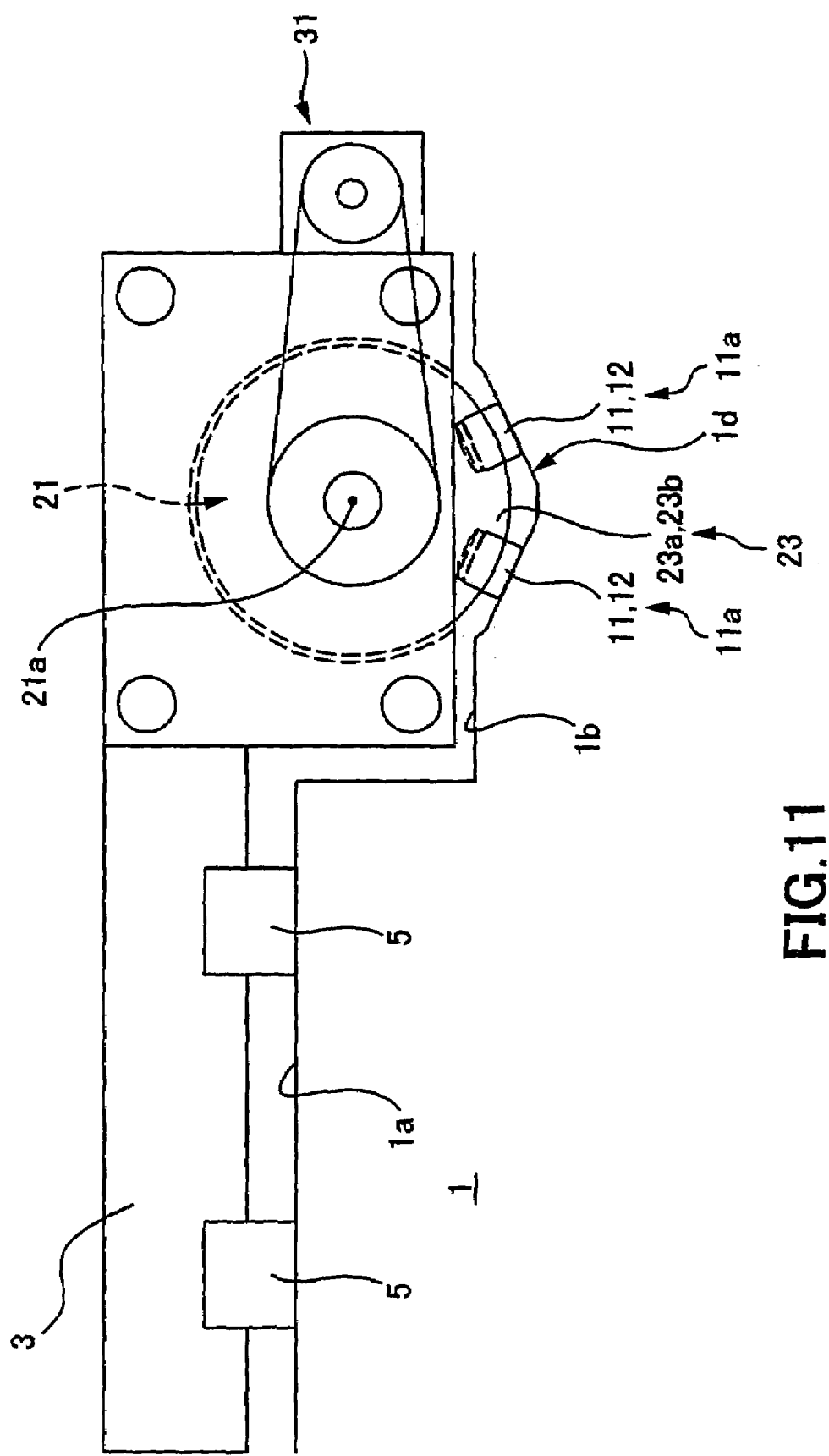
FIG. 11 is a front elevation of a drive mechanism in a third embodiment according to the present invention.

FIGS. 10 and 11 show two types of angular arrangement of cam follower rows about the cylindrical cam.

In the angular arrangement of cam follower rows shown in FIG. 10, two cam follower rows 11a, i.e., first and second cam follower rows, are arranged at an angular interval of 90° about the rotation axis 21a of a cylindrical cam 21. A base 1 has a stepped top having a horizontal top surface 1a, a horizontal lower surface 1b, and a vertical side surface 1c connecting the top surface 1a and the lower surface 1b. A movable member 3 is supported on and guided for linear movement by linear guides 5 extending on the top surface 1a. The movable member 3 extends horizontally over the top surface 1a and the lower surface 1b. An end part of the movable member 3 above the lower surface 1b holds a cylindrical cam 21. The outer circumference of the cylindrical cam 21 faces both the lower surface 1b and the side surface 1c, which connects the top surface 1a and the lower surface 1b. The first cam follower row 11a formed by linearly arranging cam followers 11 is provided on the vertical side surface 1c with the axes of rotation of the cam followers 11 extended horizontally. The second cam follower row 11a formed by linearly arranging cam followers 11 is provided on the horizontal lower surface 1b with the axes of rotation of the cam followers 11 extended vertically. The axes of rotation of the cam followers 11 forming the two cam follower rows 11a intersect the rotation axis 21a of the cylindrical cam 21 at right angles. Thus, the cam rolls 12 of the cam followers 11 are surely able to roll on the side surfaces 23a and 23b of the cam groove 23.

In the angular cam follower row arrangement shown in FIG. 11, two cam follower rows 11a, i.e., first and second cam follower rows 11a, formed by linearly arranging cam followers 11 are arranged at an angular interval of 30° about the rotation axis 21a of the cylindrical cam 21. The base 1 has a stepped top, and the lower surface 1b is provided with a V-shaped groove 1d defined by two inclined surfaces including an angle of 150°. The first and the second cam follower row 11a are extended on the two inclined surfaces of the V-shaped groove 1d, respectively. The axes of rotation of the cam followers 11 forming the two cam follower rows 11a intersect the rotation axis 21a of the cylindrical cam 21. Thus, the cam rolls 12 of the cam followers 11 are surely able to roll on the side surfaces 23a and 23b of the cam groove 23.

Phase Relationship between Cam Follower Rows

Figure 12:
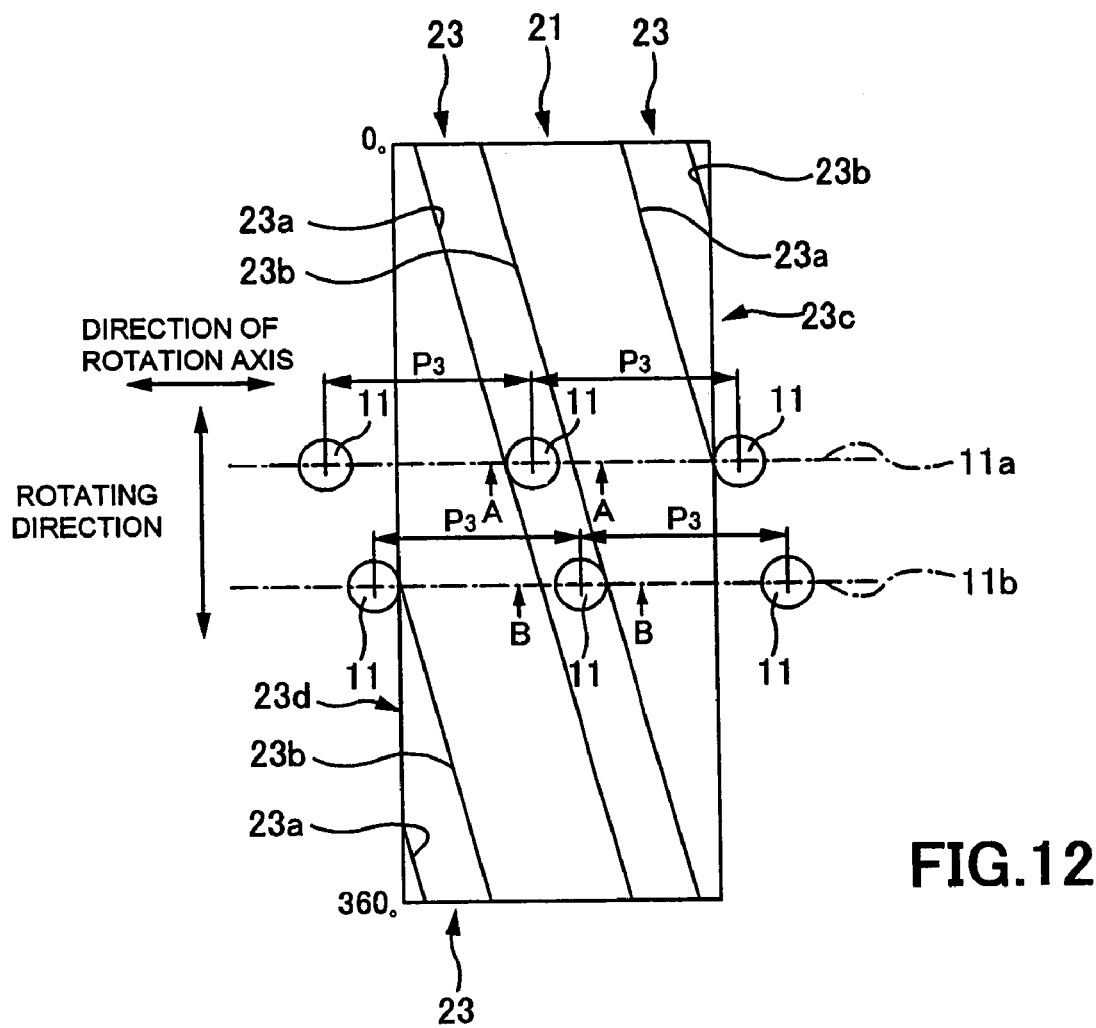
FIG. 12 is a development of a cylindrical cam included in the drive mechanism in the third embodiment according to the present invention.
Figure 13A:
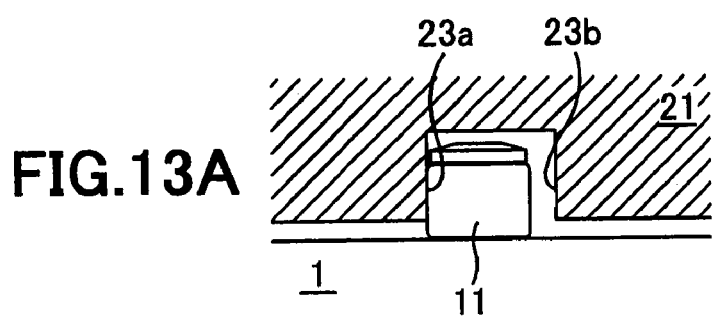
FIG. 13A is a sectional view taken on line A-A and line B-B, respectively, in FIG. 12.
Figure 13B:
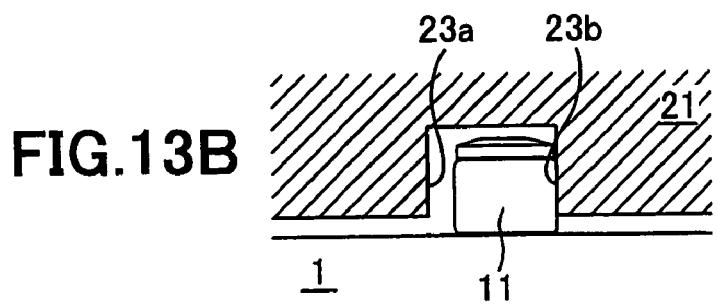
FIG. 13B is a sectional view taken on line A-A and line B-B, respectively, in FIG. 12.
Figure 14:
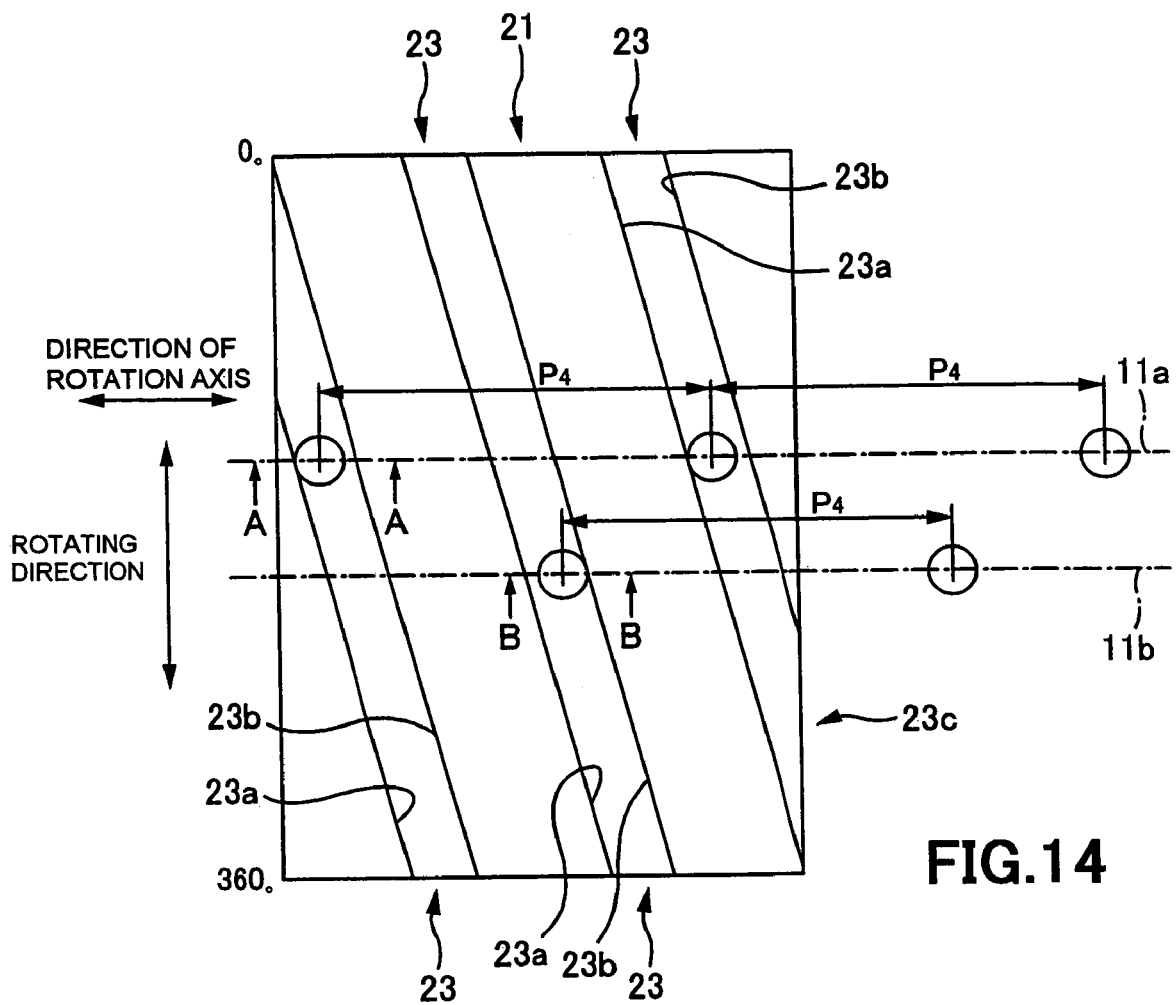
FIG. 14 is a development of a cylindrical cam included in the drive mechanism in the third embodiment of the present invention.
Figure 15A:
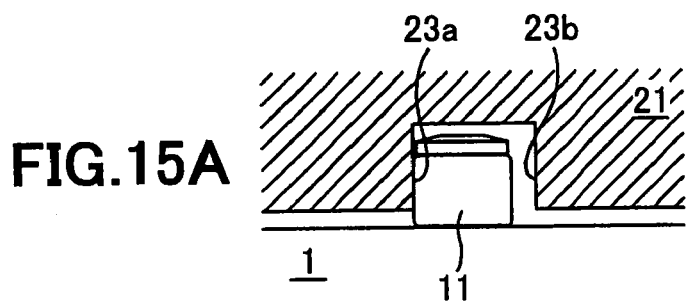
FIG. 15A is a sectional view taken on line A-A and line B-B, respectively in FIG. 14.
Figure 15B:
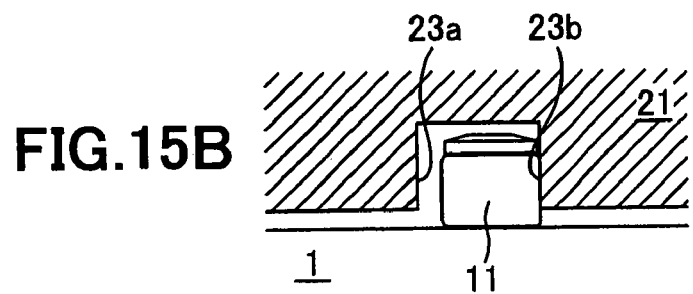
FIG. 15B is a is a sectional view taken on line A-A and line B-B, respectively in FIG. 14.

FIGS. 12 and 14 are developments of the circumferences of cylindrical cams. In each figure, an example of the relationship of the phases of two cam follower rows 11a and 11b is shown. FIGS. 13A and 13B are sectional views taken on line A-A and line B-B, respectively, in FIG. 12. FIGS. 15A and 15B are sectional views taken on line A-A and line B-B, respectively in FIG. 14.

Referring to FIG. 12, a cylindrical cam 21 is provided, in its circumference and in the rotating direction thereof, with a cam groove 23 of a uniform helix that has a length amounting to about 1.5 turns, that is, a rotation angle of 550°. The cam follower rows 11a and 11b are arranged such that the phase between the corresponding cam followers 11 of the cam follower rows 11a and 11b is shifted 60° in the rotating direction of the cylindrical cam 21. More specifically, the cam followers 11 of the second cam follower row 11b are behind the corresponding cam followers 11 of the first cam follower row 11a by the phase angle of 60°. The cam followers 11 of the cam follower rows 11a and 11b are arranged at equal pitches P3, and the pitches P3 are set so that one of the cam followers 11 comes into engagement with a front guide part 23c of the cam groove 23 every one full turn of the cylindrical cam 21.

The cam rolls of the cam followers 11 of the first cam follower row 11a roll always on one of the side surfaces 23a and 23b of the cam groove 23, i.e., the side surface 23a on the left side as viewed in FIG. 12 in this embodiment. On the other hand, the cam rolls of the cam followers 11 of the second cam follower row 11b roll always on the other side surface, i.e., the side surface 23b on the right side as viewed in FIG. 12 in this embodiment. Thus, the cam followers 11, which belong to each of the first and second cam follower rows 11a, 11b and which roll at the same time on the cam groove 23 at a shifted phase of 60°, restrain the cylindrical cam 21 from a free axial motion due to backlashes between the cam followers 11 and the side surfaces 23a and 23b of the cam groove 23. It should be noted that when the preceding cam follower 11 of the first cam follower row 11a separates from a back guide part 23d of the cam groove 23, the adjacent cam follower 11 of the first cam follower row 11a is guided by the front guide part 23c into the cam groove 23 and engages the side surface 23a. Hence the cylindrical cam 21 is restrained from a free axial motion by the cam follower 11 of the second cam follower row 11b in engagement with the side surface 23b of the cam groove 23 and the succeeding cam follower 11 of the first cam follower row 11a that has just come into engagement with the side surface 23a of the cam groove 23.

Referring to FIG. 14, a cylindrical cam 21 is provided, in its circumference and in the rotating direction thereof, with a cam groove 23 of a uniform helix that has a length amounting to about 25 turns, that is, a rotation angle of 965°. A first cam follower row 11a and a second cam follower row 11b are arranged such that the phase between the corresponding cam followers 11 of the cam follower rows 11a and 11b is shifted 415° in the rotating direction of the cylindrical cam 21. More specifically, the cam followers 11 of the second cam follower row 11b are behind the corresponding cam followers 11 of the first cam follower row 11a by a phase angle of 415°. The cam followers 11 of the cam follower rows 11a and 11b are arranged at equal pitches P4, and the pitches P4 are set so that one of the cam followers 11 comes into engagement with a front guide part 23c of the cam groove 23 every two full turns of the cylindrical cam 21.

The cam followers 11 of the cam follower rows 11a and 11b are arranged similarly to those shown in FIG. 12; the cam rolls of the cam followers 11 of the first cam follower row 11a roll always on one of the side surfaces 23a and 23b of the cam groove 23, i.e., the side surface 23a on the left side as viewed in FIG. 14 in this embodiment. In addition, the cam rolls of the cam followers 11 of the second cam follower row 11b roll always on the other side surface, i.e., the side surface 23b on the right side as viewed in FIG. 14 in this embodiment. Thus, the cam followers 11, which belong to each of the first and second cam follower rows 11a, 11b and which roll at the same time on the cam groove 23 at a shifted phase of 415°, restrain the cylindrical cam 21 from a free axial motion due to backlashes between the cam followers 11 and the side surfaces 23a and 23b of the cam groove 23. It should be noted that the preceding cam follower 11 of the first cam follower row 11a separates from a back guide part 23d of the cam groove 23 after the succeeding cam follower 11 of the first cam follower row 11a engages in the cam groove 23. Hence the cylindrical cam 21 is restrained from a free axial motion by the cam follower 11 of the second cam follower row 11b and the succeeding cam follower 11 of the first cam follower row 11a engaged in the cam groove 23.

Movable Table Unit Provided with Drive Mechanism of the Present Invention

Figure 16:
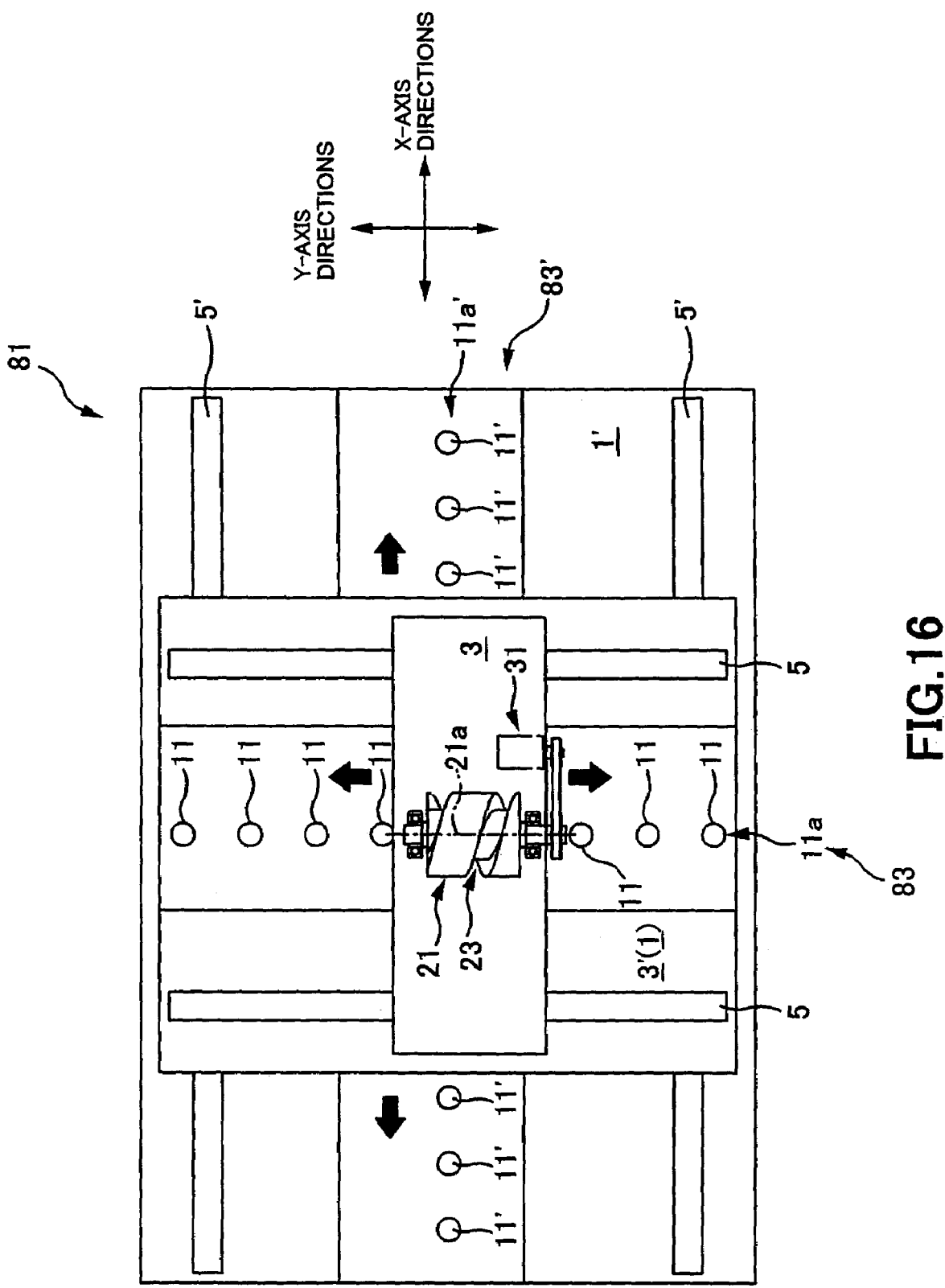
FIG. 16 is a plan view of a movable table unit including a drive mechanism according to the present invention.
Figure 17:
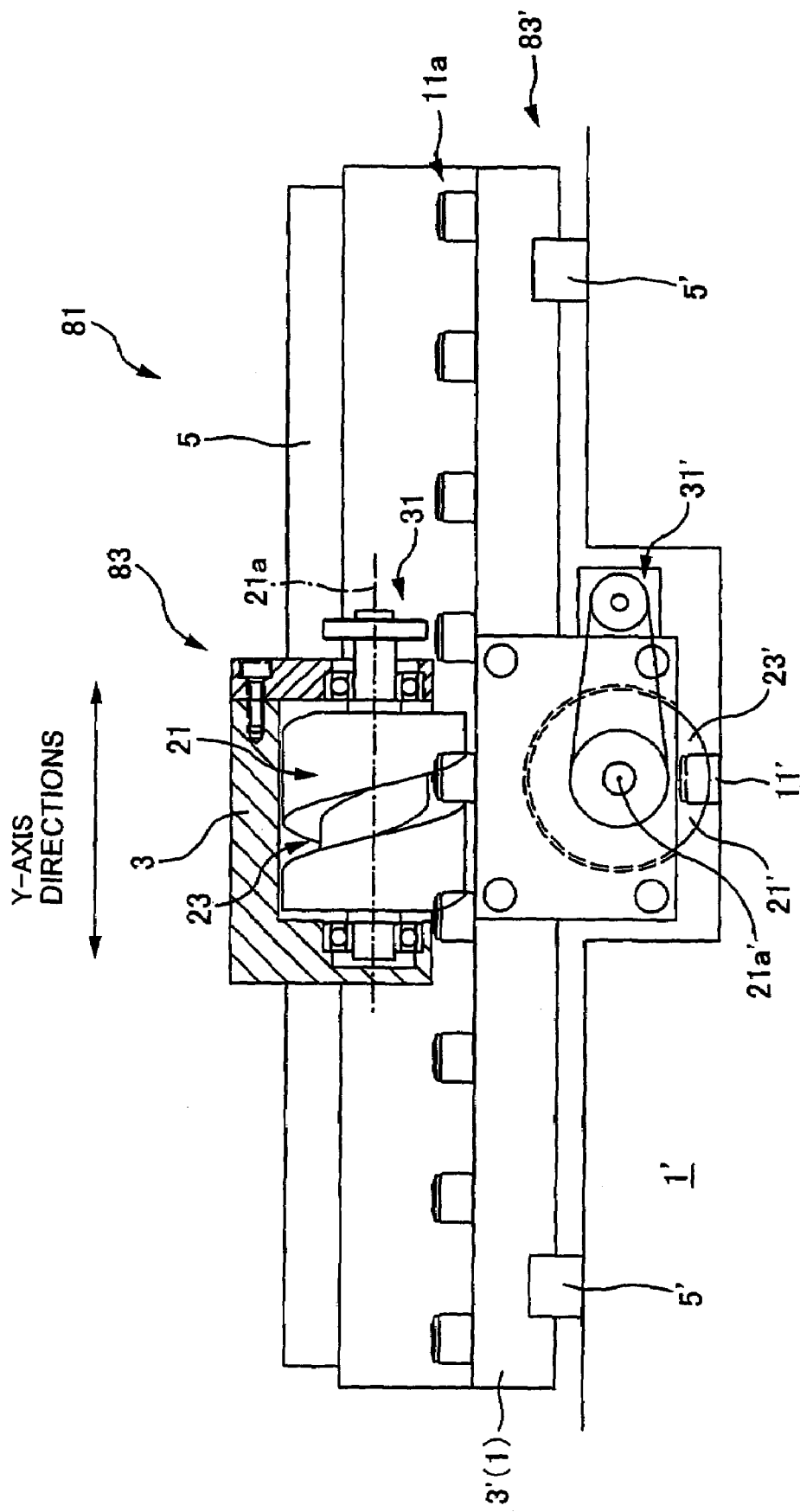
FIG. 17 is a front elevation of the table unit shown in FIG. 16.

FIGS. 16 and 17 are a partly cutaway plan view and a partly cutaway front view, respectively, of a movable table unit provided with a drive mechanism of the present invention.

A movable table unit 81 is an XY table 81 employed in a machine tool, such as a machining center. The essential function of the XY table 81 is to horizontally move a work table supporting a workpiece thereon in directions in the direction of an X- and a Y-axis perpendicularly intersecting each other.

In order to realize such an XY table 81, two movable table units (i.e., an upper table unit 83 and a lower table unit 83') respectively provided movable members 3 and 3' that move linearly on bases 1 and 1' through drive mechanisms are stacked. The base 1 included in the upper movable table unit 83 and the movable member 3' of the lower movable table unit 83' are fixedly joined together. The movable members 3 and 3' are linearly movable in the direction of the Y-axis and the X-axis, respectively, and hence the upper movable member 3 serves as the work table that can be moved in directions in the direction of the X-axis and the Y-axis. Component members of the lower movable table unit 83' will be denoted by reference characters with a dash (') to facilitate discrimination between the respective component parts of the upper movable table unit 83 and the lower movable table unit 83'.

The XY table 81 will be described.

The XY table 81 includes a lower base 1' having a horizontal top surface and fixedly installed on the floor, a pair of lower linear guides 5' extended on the top surface of the lower base 1', an intermediate table 3' supported on the lower base 1' and guided by the lower linear guides 5' for linear movement, a pair of upper linear guides 5 extended on the intermediate table 3, and an upper table 3 supported on the intermediate table 3' and guided by the upper linear guides 5 for linear movement. The lower linear guides 5' are extended horizontally in the direction of the X-axis on the lower base 1' to guide the intermediate table 3' for linear movement in the direction of the X-axis. The upper linear guides 5 are extended horizontally in the direction of the Y-axis on the upper base 1 to guide the upper table 3 for linear movement in the direction of the Y-axis. Thus, the upper table 3 can be moved linearly in directions of the X-axis and the Y-axis through the combined linear motions with the intermediate table 3'. It goes without saying that intermediate table 3' serves as the movable member 3' of the lower movable table unit 83', and the base 1 of the upper movable table unit 83.

Two drive mechanisms, i.e., a lower drive mechanism and an upper drive mechanism, are provided for moving the intermediate table 3' and the upper table 3, respectively.

The lower drive mechanism is disposed in the center of the top surface of the lower base 1' between the pair of the lower linear guides 5'. The lower drive mechanism includes cam followers 11' arranged in a straight lower cam follower row 11a' in the direction of the lower linear guides 5', and a cylindrical cam 21' provided in its circumference with a cam groove 23' and rotatably supported on the intermediate table 3'. The axis 21a' of rotation of the cylindrical cam 21' is arranged in the direction of and right above the lower cam follower row 11a'. In this way, as the cylindrical cam 21' is driven for rotation, the lower cam followers 11' come successively into, engagement with the helical cam groove 23' to move the lower table 3' straight in the direction of the X-axis.

The upper drive mechanism for driving the upper table 3 is disposed in the center of the top surface of the upper base 1 between the pair of upper linear guides 5. The upper drive mechanism includes cam followers 11 arranged in a straight lower cam follower row 11a in the direction of the upper linear guides 5, and a cylindrical cam 21 provided in its circumference with a cam groove 23 and rotatably supported on the lower table 3'. The axis 21a of rotation of the cylindrical cam 21 is arranged in the direction of and right above the upper cam follower row 11a. In this way, as the cylindrical cam 21 is driven for rotation, the upper cam followers 11 come successively into engagement with the cam groove 23 to move the upper table 3 straight in the direction of the Y-axis. The drive mechanisms 31, 31' for driving the cylindrical cams 21 and 21' for rotation are the belt drive mechanisms described above.

Figure 24:
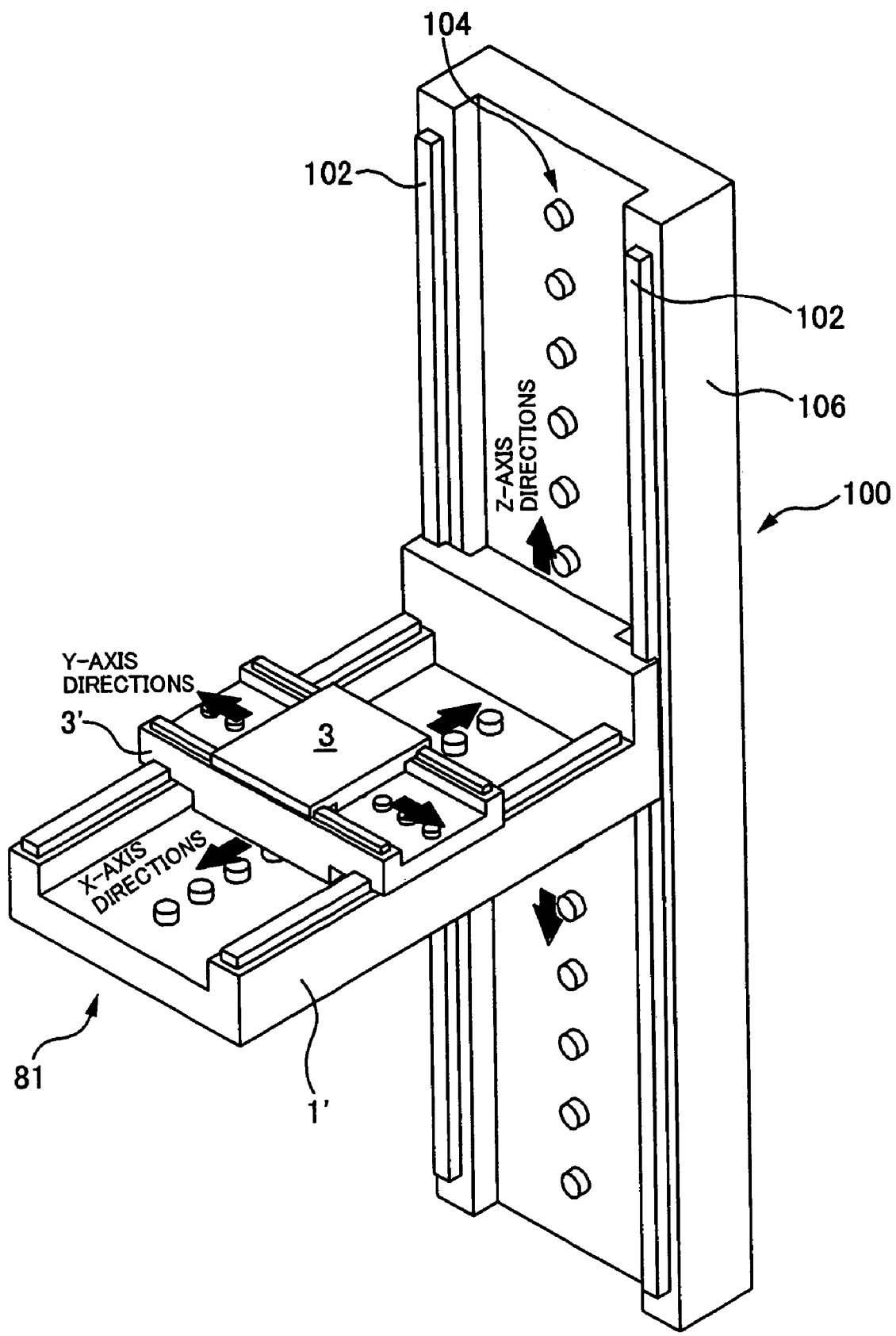
FIG. 24 is a perspective view showing an outline of an XYZ table 100.

Next, referring to FIG. 24 there is described an XYZ table 100 to which the drive mechanism according to the present invention is applied. FIG. 24 is a perspective view showing a general outline of the XYZ table 100.

In the XYZ table 100, the above-described XY table 81 is made movable in the Z direction. In more detail, a pair of linear guides 102 are provided on the Z-axis base 106. In between these linear guides 102, there is arranged linearly a cam follower row 104 along the linear guides 102. With a similar structure to the above-described drive mechanism, the base 1' is made movable in the Z direction in respect to the Z-axis base 106.

With this structure, the table 3 is able to move not only in the X and Y direction, but also in the Z direction.

Application of the Drive Mechanism of the Present Invention to Conveyance Line

Next, examples in which the drive mechanism of the present invention is applied to various conveyance lines will be described with reference to the drawings.

APPLICATION EXAMPLE 1

Figure 25:
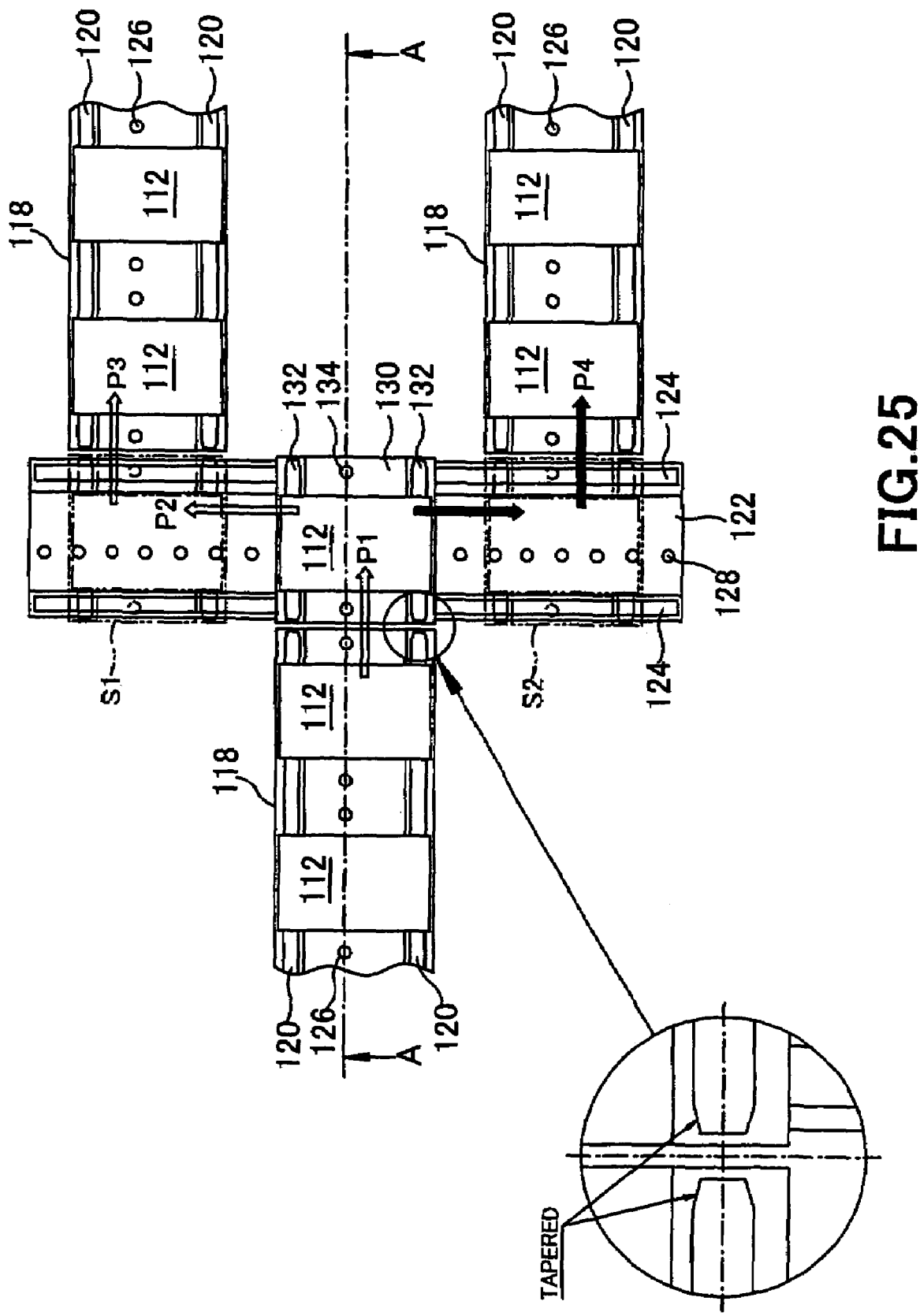
FIG. 25 is a plan view of an application example 1 of a conveyance line applying the drive mechanism according to the present invention.
Figure 26:
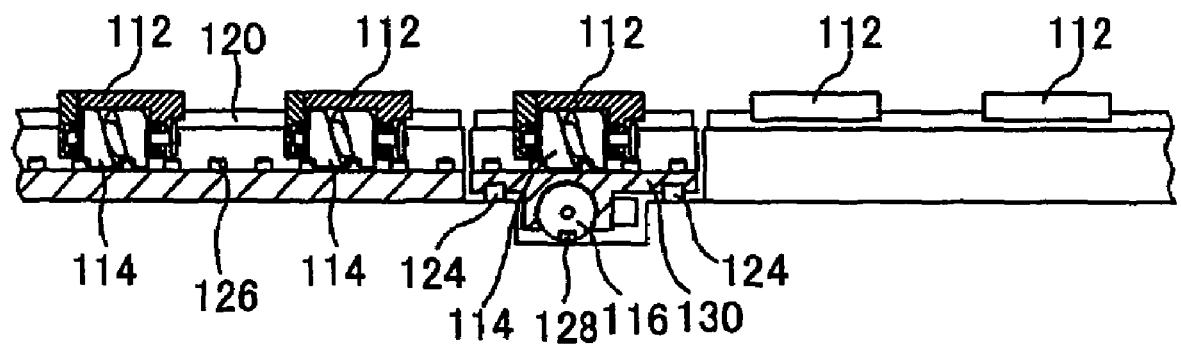
FIG. 26 is a sectional view along A-A of FIG. 25.

FIG. 25 shows a plan view of an application example 1 of a conveyance line to which the drive mechanism of the present invention is applied. FIG. 26 shows an A-A section view of FIG. 25.

This conveyance line is for conveying various articles such as a component or a workpiece placed on the mounting base 112.

Each of the fixed bases 118 is provided with a pair of linear guides 120 and a cam follower row 126. The fixed base 122 is also provided with a pair of linear guides 124 and a cam follower row 128.

On the fixed base 122, there is provided a movable base 130 that is provided with a pair of linear guides 132 and a cam follower row 134. This movable base 130 has a rotatable cylindrical cam 116. This cylindrical cam 116 subsequently engages each cam follower in the cam follower row 128, and the movable base 130 is made to move in the P2 direction in FIG. 25.

Each mounting base 112 has a rotatable cylindrical cam 114. Each cam 114 engages the cam follower rows 126, 134, and the mounting base 112 can be moved in the P1, P3, or P4 direction.

Note that, the end portions of each linear guide 120, 124, 132 are tapered. Thus, the movable base 130 is able to easily move over from one linear guide to another linear guide.

Next, the conveyance motion of this conveyance line 110 is explained.

The article placed on the mounting base 112 is conveyed with the mounting base 112 in the P1 direction as shown in FIG. 25, and arrives at the movable base 130.

The article and the mounting base 112 that have arrived at the movable base 130 move with the movement of the movable base 130 in the P2 direction (direction shown by black arrow or white arrow), and arrive at the positions S1, S2 shown by the double-dashed lines.

The article which has arrived at the position of the double-dashed lines shown by S1 or S2 is further conveyed with the mounting base 112 moving in the P3 or P4 direction.

APPLICATION EXAMPLE 2

Figure 27:
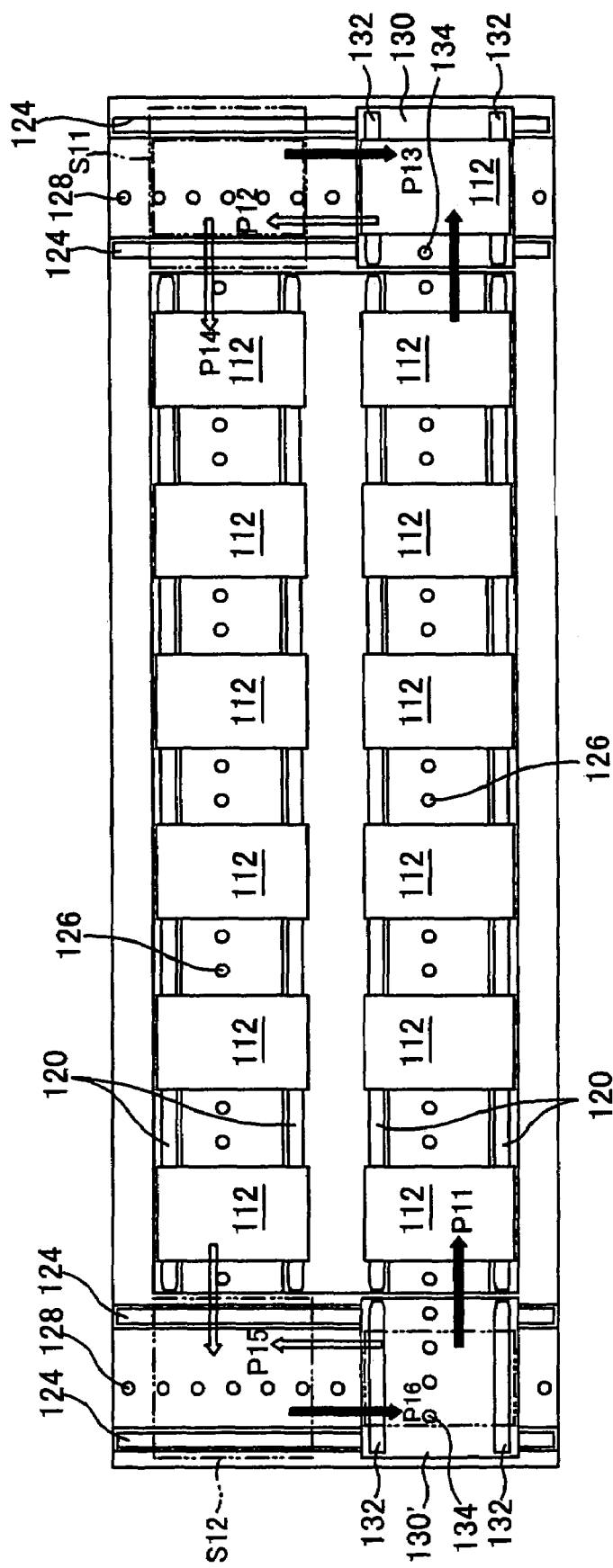
FIG. 27 is a plan view of an application example 2 applying the drive mechanism according to the present invention.
Figure 28:
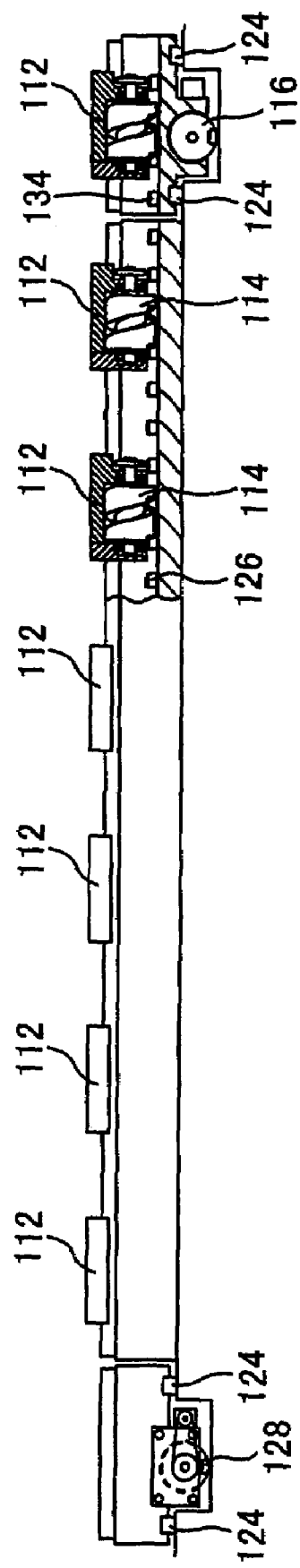
FIG. 28 is a front view (partly a sectional view) of FIG. 27.

FIG. 27 shows a plan view of another application example 2 to which the drive mechanism of the present invention is applied, and FIG. 28 shows a front view of FIG. 27 (partly a sectional view). Note that, similar structures and functions as before are denoted with the same reference numerals.

A basic structure of the moving mechanism of the mounting base 112 in this application example is similar to that of application example 1, thus explanation will be omitted.

Next, the conveyance movement in this application example 2 is explained referring to arrows P11 to P16 shown in FIG. 27.

In FIG. 27, the mounting base 112 positioned at the left bottom side moves in the direction shown by arrow P11 and stopping when necessary, to arrive on the movable base 130 (right side).

The mounting base 112, which has reached the movable base 130 (right side), reaches the position of double-dashed line shown by S11 with the movement of the movable base 130 (right side) in the P12 direction.

The mounting base 112, which has reached the position of the double-dashed line shown by S11, moves in the direction shown by the arrow P14 while stopping if necessary, to reach the movable base 130' (left side). Note that, at this time, the movable base (left side) 130' is located at the dotted line position shown by S12 in FIG. 27.

The mounting base 112, which has reached the movable base (left side) 130', moves with the movable base (left side) 130' in the direction of the arrow P16.

In this way, it is possible to structure an effective conveyance line with a mode such as shown in application example 2.

APPLICATION EXAMPLE 3

Figure 29:
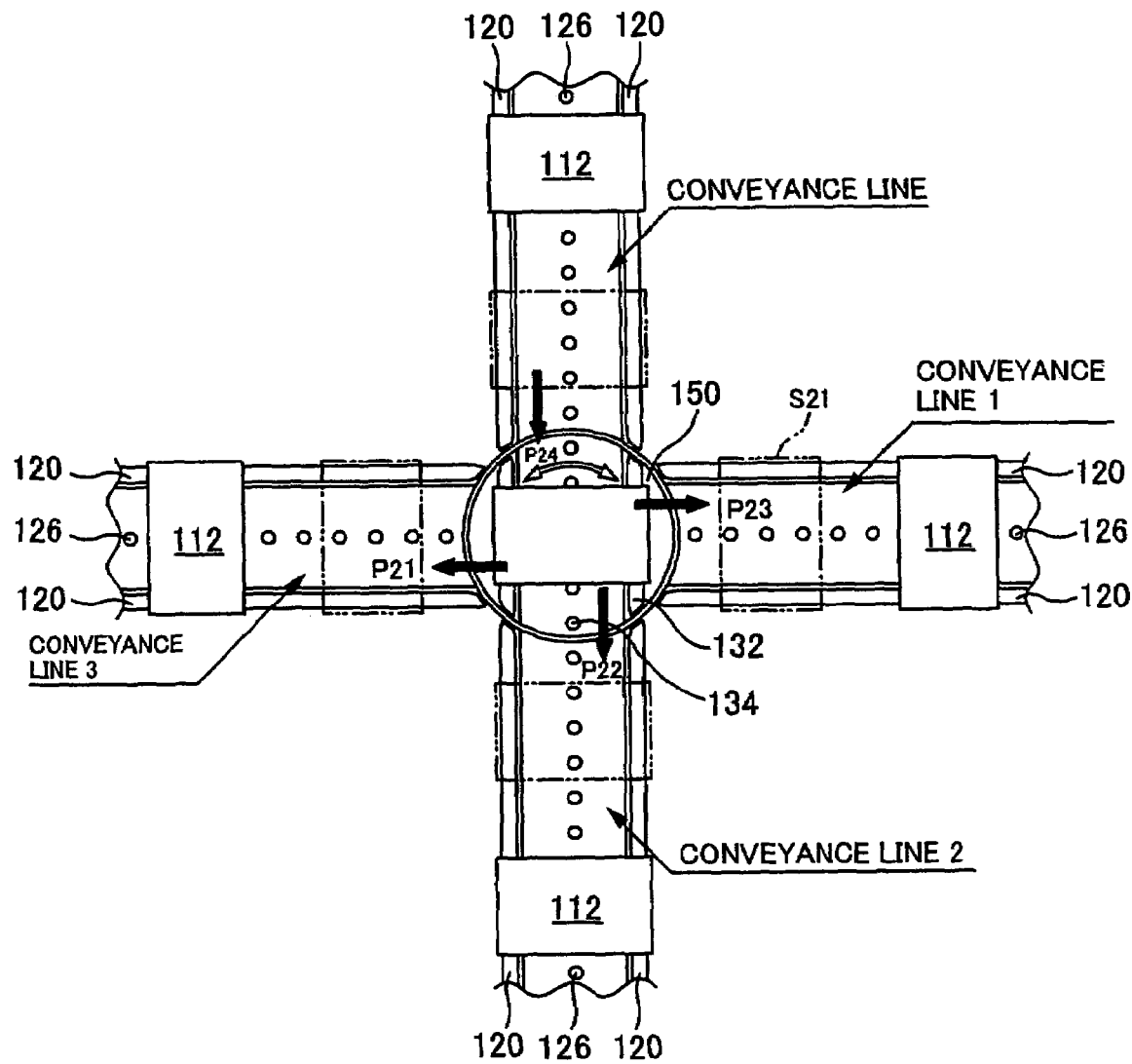
FIG. 29 is a plan view of an application example 3 applying the drive mechanism according to the present invention.
Figure 30:
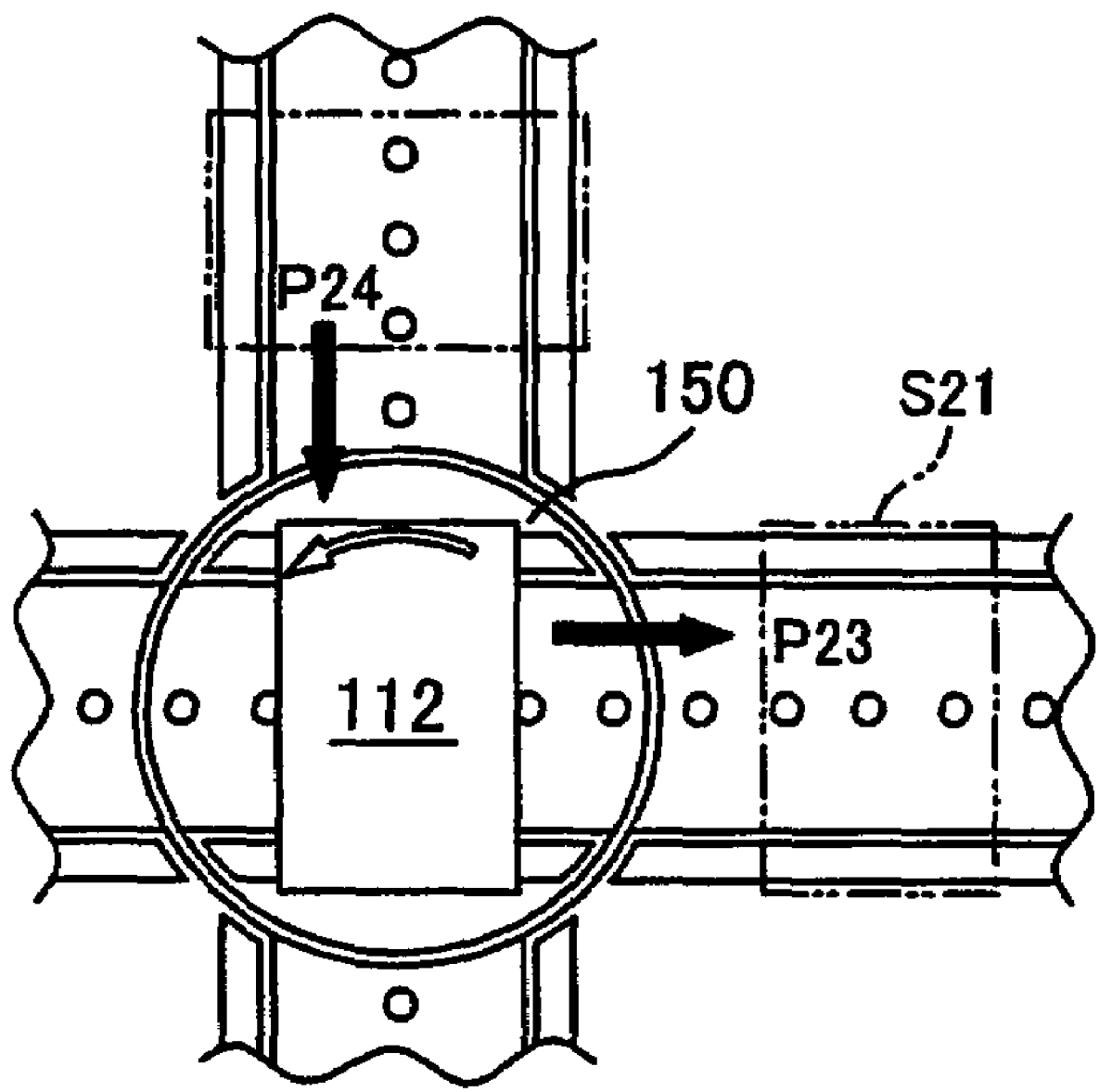
FIG. 30 is a view showing a rotating table 150 in a rotated state.

FIG. 29 shows a plan view of another application example 3 to which the drive mechanism of the present invention is applied, and FIG. 30 shows a state in which a rotating table 150 is rotating. Note that, similar structures and functions as before are denoted with the same reference numerals.

A basic structure of the moving mechanism of the mounting base 112 in this application example is similar to that of application example 1, thus explanation will be omitted. However, in this application example 3, a pair of linear guides 132 and a cam follower row 134 are provided on a rotatable rotating table 150.

Next, the conveyance operation in this application example 3 is explained referring to arrows P21 to P24 shown in FIGS. 29 and 30.

In FIG. 29, the mounting base 112 positioned at the central upper portion moves in the direction shown by arrow P24 and arrives on the rotating table 150.

When the mounting base 112 arrives on the rotating table 150, the rotating table 150 rotates 900 with the mounting base 112 in the anticlockwise direction, to a state shown in FIG. 30.

When the rotation operation of the rotating table 150 finishes, the mounting base 112 moves to the direction shown by arrow P23 in FIG. 29 (FIG. 30), and reaches a position S21 shown by a double-dashed line.

Note that, such movement of the mounting base 112 is merely an example.

The rotating table 150 may be rotated 90° clockwise with the mounting base 112, and after the rotation operation has finished, the mounting base 112 may be moved to the direction shown by arrow P21 in FIG. 29 (FIG. 30), or the mounting base 112 may be further moved in the direction shown by arrow P22 in FIG. 29 (FIG. 30), without rotating the rotating table 150.

APPLICATION EXAMPLE 4

Figure 31:
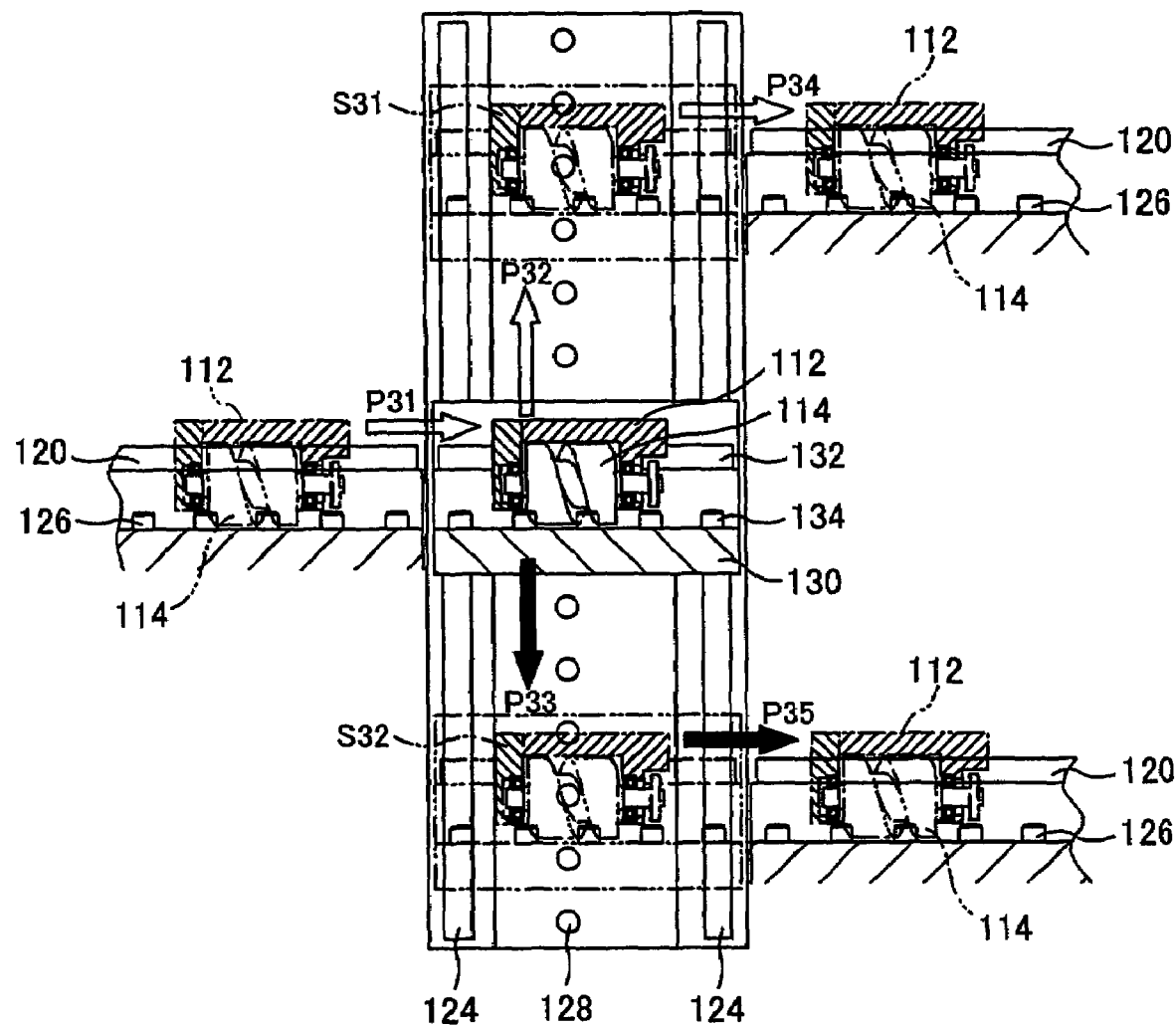
FIG. 31 is a front view of an application example 4 applying the drive mechanism according to the present invention.
Figure 32:
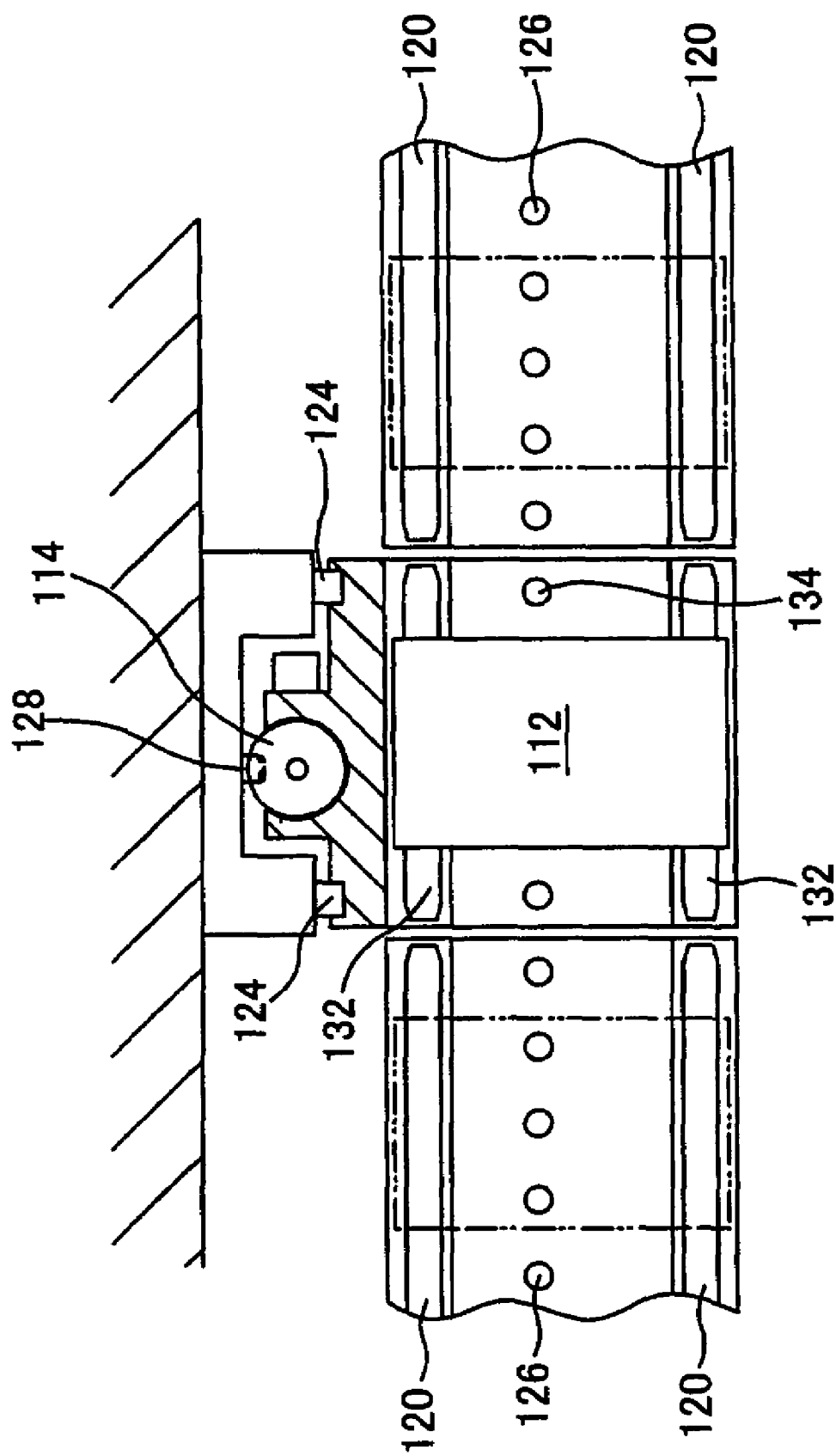
FIG. 32 is a top view of an application example 4 applying the drive mechanism according to the present invention.

FIG. 31 shows a front view of another application example 4 to which the drive mechanism according to the present invention is applied, and FIG. 32 shows a top view of another application example 4 to which the drive mechanism of the present invention is applied. Note that, similar structures and functions as before are denoted with the same reference numerals.

The above-described application examples 1 to 3 are a flat type conveyance line, but this application example 4 is a three-dimensional conveyance line.

A basic structure of the moving mechanism of the mounting base 112 in this application example is similar to that of application 1, thus explanation will be omitted.

Next, the conveyance operation in this application example 4 will be described, referring to arrows P31 to P35 shown in FIG. 31.

In FIG. 31, the mounting base 112 shown by dotted lines on the left moves in the direction shown by arrow P31, and arrives on the movable base 130.

The mounting base 112 which has reached the movable base 130 moves in the direction of P32 (movement to the upper direction) together with the moving member 130, and reaches the position S31 shown by the dotted line.

The mounting base 112, which has reached the position S31 shown by dotted lines, moves in the direction shown by arrow P34, and reaches a position in the right upper portion shown by dotted lines.

Further, when the movable base 130 on which the mounting base 112 is mounted moves in the P33 direction (moves in the downward direction), the mounting base 112 reaches the position S32 shown by the dotted line.

The mounting base 112, which has reached the position S32 shown by the dotted line, moves in the direction shown by arrow P35, and reaches the position in the right lower portion shown by the dotted line.

APPLICATION EXAMPLE 5

Figure 33:
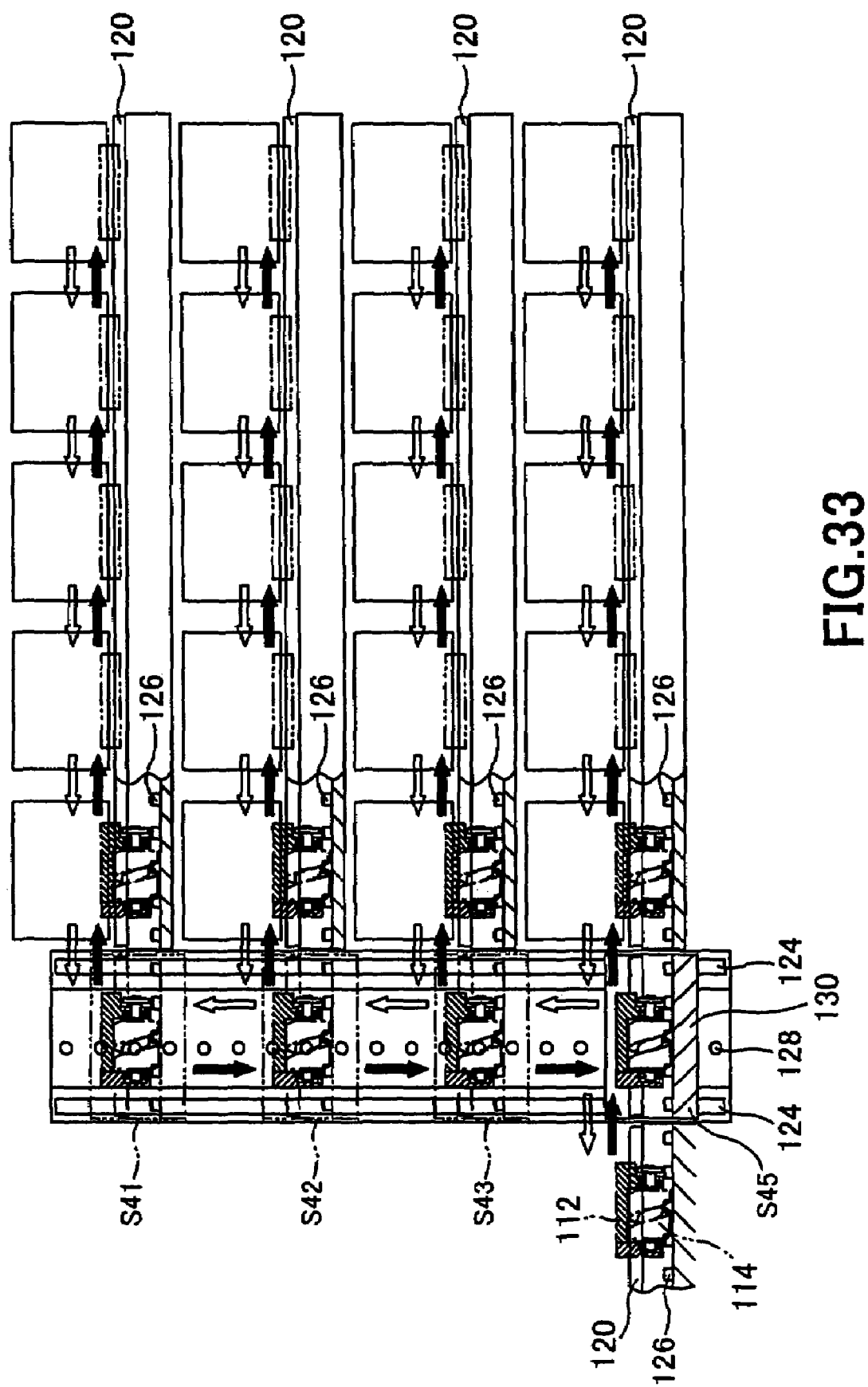
FIG. 33 is a front view of an application example 5 applying the drive mechanism according to the present invention.

FIG. 33 shows a front view of another application example 5 to which the drive mechanism of the present invention is applied. Note that, similar structures and functions as before are denoted with the same reference numerals.

The application examples 1 to 3 described above are of a flat conveyance line, but this application example 5 is a three-dimensional conveyance line, similar to application example 4.

A basic structure of the moving mechanism of the mounting base 112 in this application example is similar to that of application example 1, thus explanation will be omitted.

In this application example 5, the movable base 130 is made movable along linear guides 124 to positions S41 to S45.

When the movable base 130 is located in the S45 position, it is possible for the mounting base 112 on the linear guide 120 located on the left side in FIG. 33 to move to the right and onto the movable base 130, and for the mounting base 112 on the movable base 130 to move to the left and onto that linear guide 120. Further, when the movable base 130 is located in position S45, it is possible for the mounting base 112 on the linear guide 120 located on the right side in FIG. 33 to move to the left and onto the movable base 130, and for the mounting base 112 on the movable base 130 to move to the right and onto that linear guide 120.

Further, in the state that the movable base 130 is located in the S41 to S45 positions, it is possible for the mounting base 112 on the linear guide 120 located on the right side in FIG. 33 to move to the left and onto the movable base 130, and for the mounting base 112 on the movable base 130 to move to the right and onto that linear guide 120.

APPLICATION EXAMPLE 6

Figure 34:
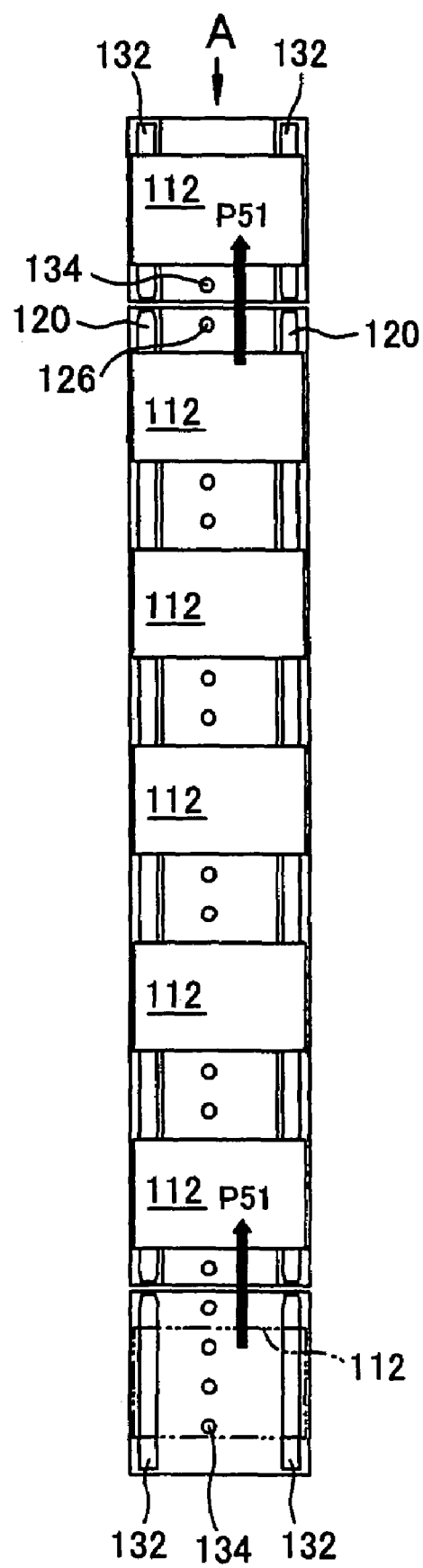
FIG. 34 is a front view of an application example 6 applying the drive mechanism according to the present invention.
Figure 35:
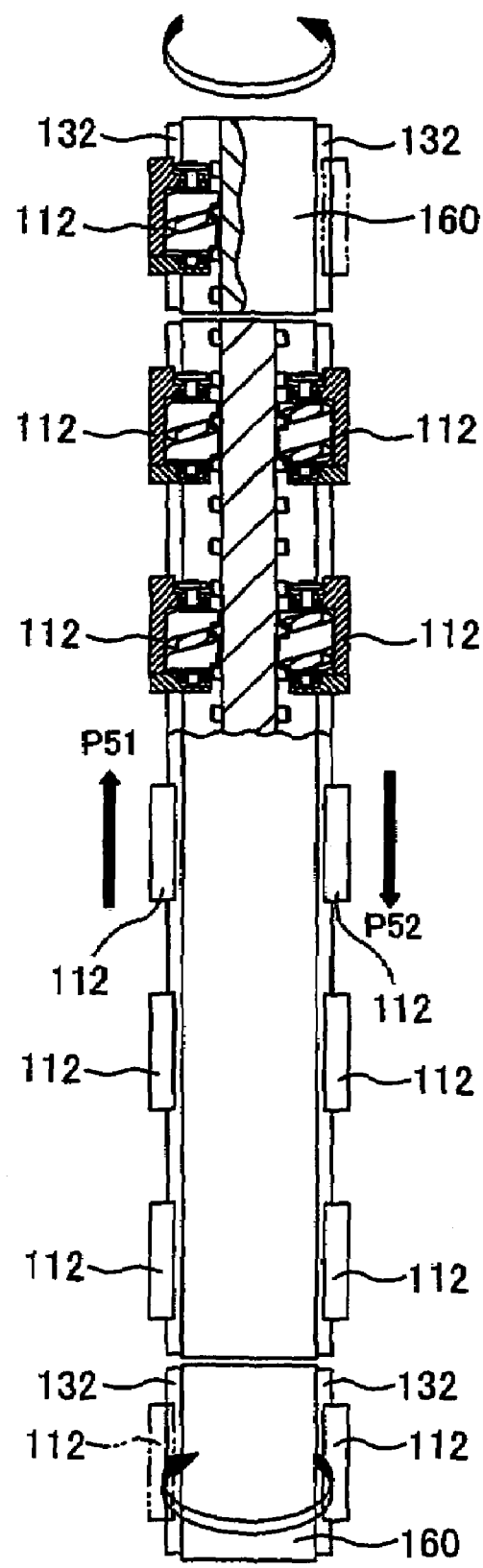
FIG. 35 is a top view of an application example 6 applying the drive mechanism according to the present invention.
Figure 36:
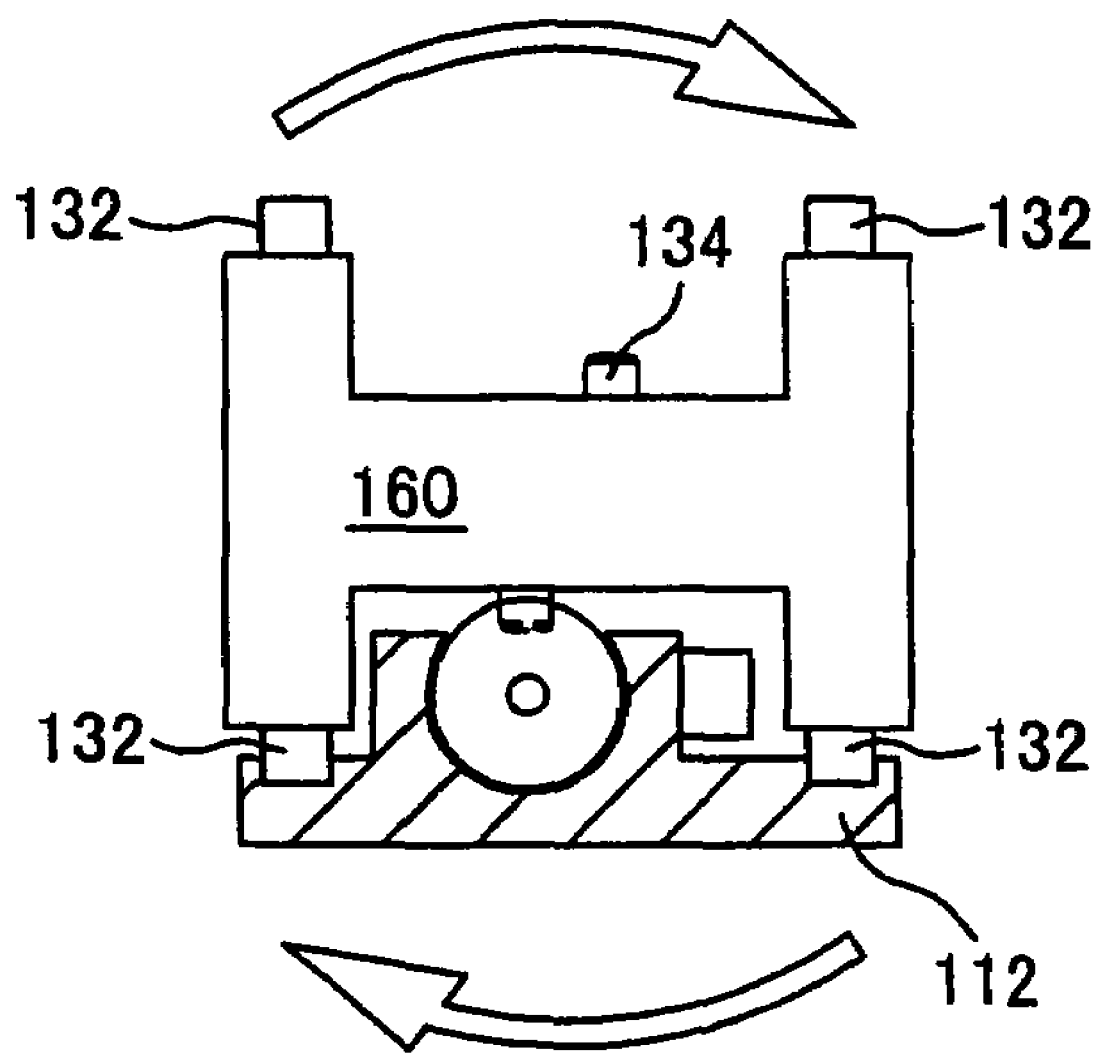
FIG. 36 is a top view of an application example 6 applying the drive mechanism according to the present invention.

FIG. 34 shows a front view of another application example 6 to which the drive mechanism according to the present invention is applied, FIG. 35 shows a side view of another application example 6 to which the drive mechanism according to the present invention is applied, and FIG. 36 shows a top view of another application example 6 to which the drive mechanism according to the present invention is applied. Note that, similar structures and functions as before are denoted with the same reference numerals. This application example 6 is also a three-dimensional conveyance line as similar to application examples 4, 5.

A basic structure of the moving mechanism of the mounting base 112 in this application example is similar to that of application example 1, thus explanation will be omitted. However, in this application example 6, a rotatable revolving portion 160 is provide on an upper portion or a lower portion of the device, and a pair of linear guides 132 and a cam follower row 134 are provided on its front surface and back surface.

Next, the conveying movement in this application example 6 is explained referring to arrows P51 and P52 shown in FIGS. 34 and 35.

In FIGS. 34 and 35, the mounting base 112 shown by dotted lines at the lowest portion, namely the mounting base 112 on the lower revolving portion 160, moves in the direction shown by arrow P51 (upward direction), and moves away from the lower revolving portion 160.

The mounting base 112, which has moved away from the lower revolving portion 160, further moves in the direction shown by the arrow P51 (upward direction), and arrives on the upper revolving portion 160.

When the mounting base 112 reaches the upper revolving portion 160, the revolving portion 160 revolves 180°.

When the upper revolving portion 160 revolves 180°, the mounting base 112 on the upper revolving portion 160 moves in the direction shown by arrow P52 (downward direction), and moves away from the upper revolving portion 160.

The mounting base 112, which has moved away from the upper revolving portion 160, further moves in the direction shown by arrow P52 (downward direction), and arrives on the lower revolving portion 160.

When the mounting base 112 reaches the lower revolving portion 160, the lower revolving portion 160 revolves 180°.

APPLICATION EXAMPLE 7

Figure 37:
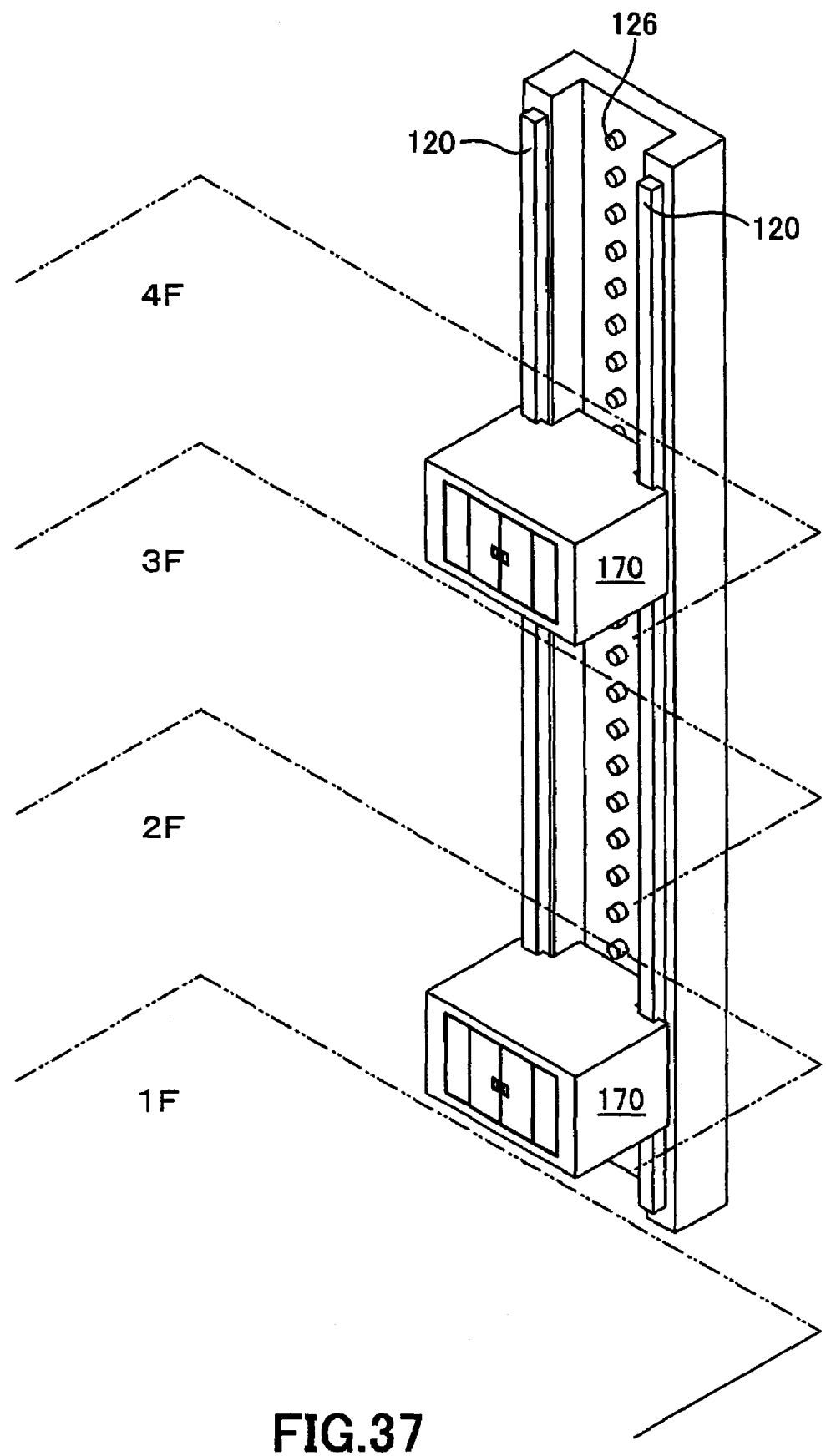
FIG. 37 is a perspective view of an application example 7 applying the drive mechanism according to the present invention.

FIG. 37 shows a perspective view of another application example 7 to which the drive mechanism according to the present invention is applied. Note that, similar structures and functions as before are denoted with the same reference numerals.

This application example 7 is an example of an elevator system to which the drive mechanism according to the present invention is applied. An elevator 170 has a rotatable cylindrical cam (not shown), and this cylindrical cam subsequently engages each cam follower of the cam follower row 126 to make the elevator 170 move upwards and downwards. According to such elevator system, each elevator 170 is able to move independently, so that an elevator system with a high degree of freedom may be constructed.

Note that, FIG. 37 shows two of the elevators 170, but there may be any number of elevators 170.

APPLICATION EXAMPLE 8

Figure 38:
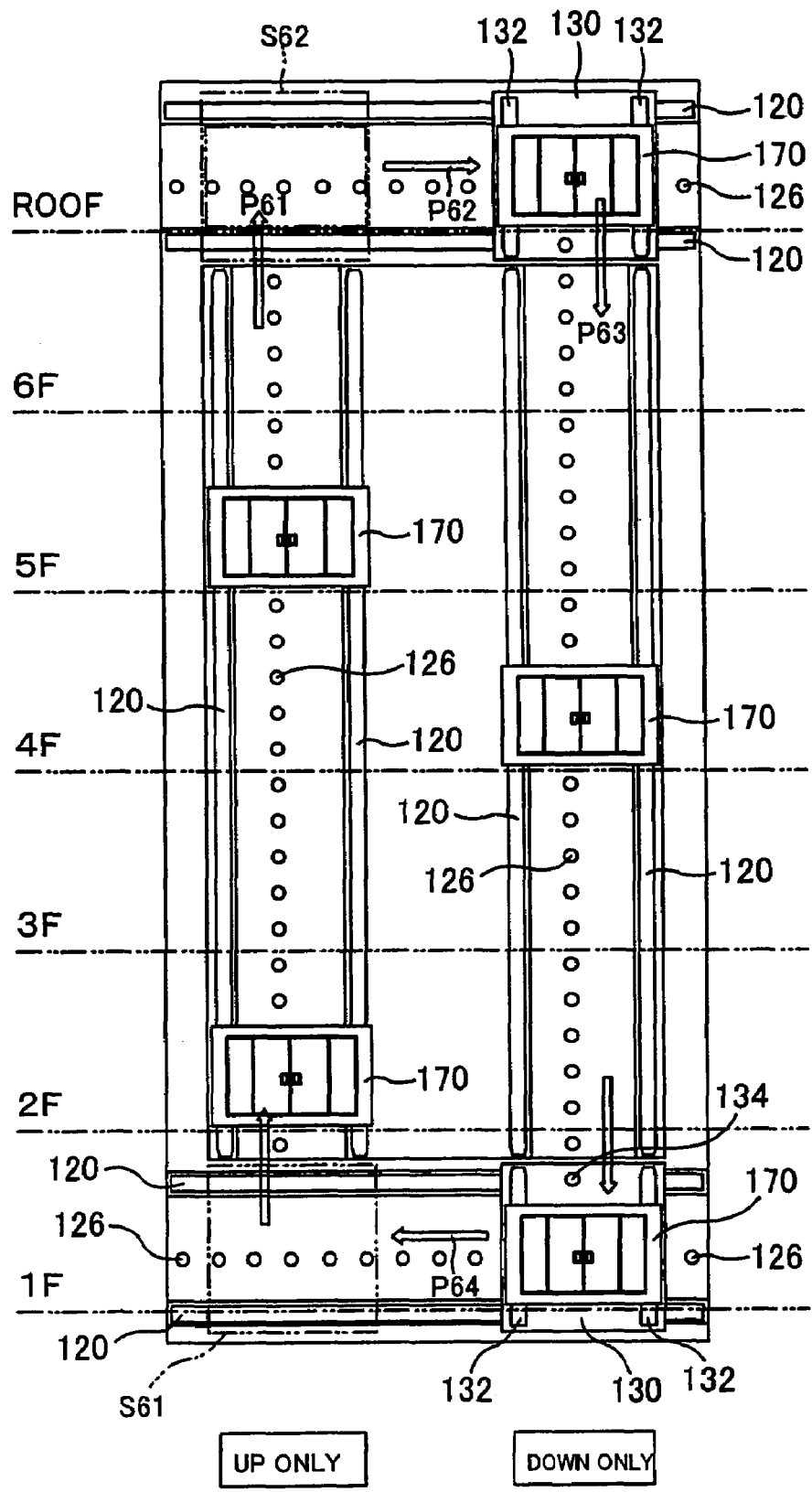
FIG. 38 is a front view of an application example 8 applying the drive mechanism according to the present invention.

FIG. 38 shows a front view of another application example 8 to which the drive mechanism according to the present invention is applied. Note that, similar structures and functions as before are denoted with the same reference numerals. This application example 8 is also an elevator system, as similar to application example 7.

In this application example 8, the elevator 170 has a rotatable cylindrical cam that is not shown, and this cylindrical cam subsequently engages each cam follower in the cam follower row to make the elevator 170 move up, down, left or right.

Next, the conveying operation in this application example 8 is explained referring to arrows P61 to P64 shown in FIG. 38.

In FIG. 38, the elevator 170 on the movable base 130, which is positioned at the right upper portion, moves in the arrow P63 direction (downward direction) in FIG. 38, and moves onto the linear guides 120, and stops at each floor when necessary.

When the elevator 170 further moves in the arrow P63 direction (downward direction) on the linear guides 120, it reaches the movable base 130 at the right lower portion.

After the elevator 170 has reached the movable base 130 at the right lower portion, the movable base 130 at the right lower portion moves in the direction of the arrow P64 (left direction), and reaches a position S61 shown by dotted lines.

When the movable base 130 reaches a position S61 shown by dotted lines, the elevator 170 moves in the direction of the arrow P61 (upward direction) onto the linear guides 120, and stops at each floor when necessary.

When the elevator 170 further moves in the direction of the arrow P61 (upward direction) on the linear guides 120, it reaches the movable base 130 waiting at position S62 shown in dotted lines.

When the elevator 170 reaches the movable base 130, the movable base 130 moves from the position S62 shown by dotted lines in the direction shown by the arrow P62 (the right direction), thus the elevator 170 reaches the right upper portion together with the movable base 130.

Although the invention has been described in its preferred embodiments, the following changes and modifications are possible therein without departing from the spirit and scope of the present invention.

Figure 18:
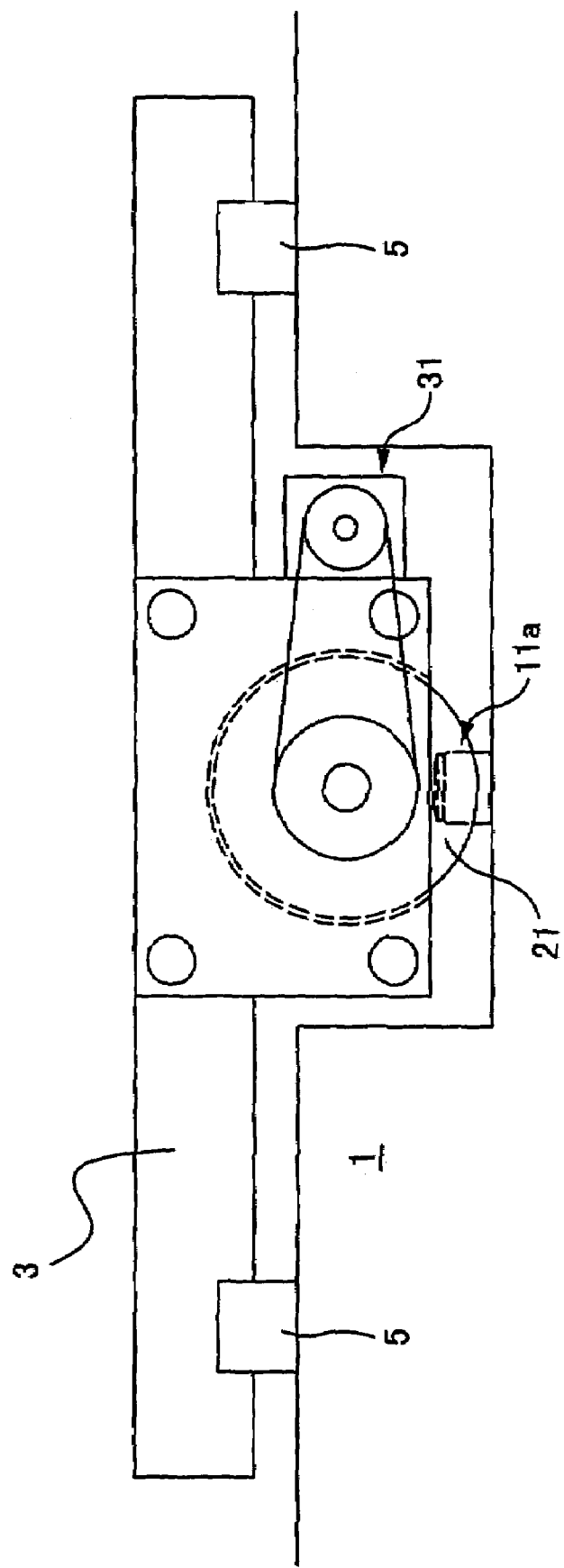
FIG. 18 is a front elevation of a drive mechanism in a modification of the drive mechanism in the first embodiment.

In the first embodiment, the pair of linear guides 5 is disposed to support the movable member 3 on one side of the cam follower row 11a, but it not limited thereto. The pair of linear guides 5 may be disposed on the opposite sides, respectively, of the cam follower row 11a as shown in the front view of the drive mechanism shown in FIG. 18. When the linear guides 5 are disposed as shown in FIG. 18, the movable member 3 can be extended over the cam follower row 11a, and can more stably be supported by the linear guides 5 on both the opposite sides of the cam follower row 11a.

Figure 19:
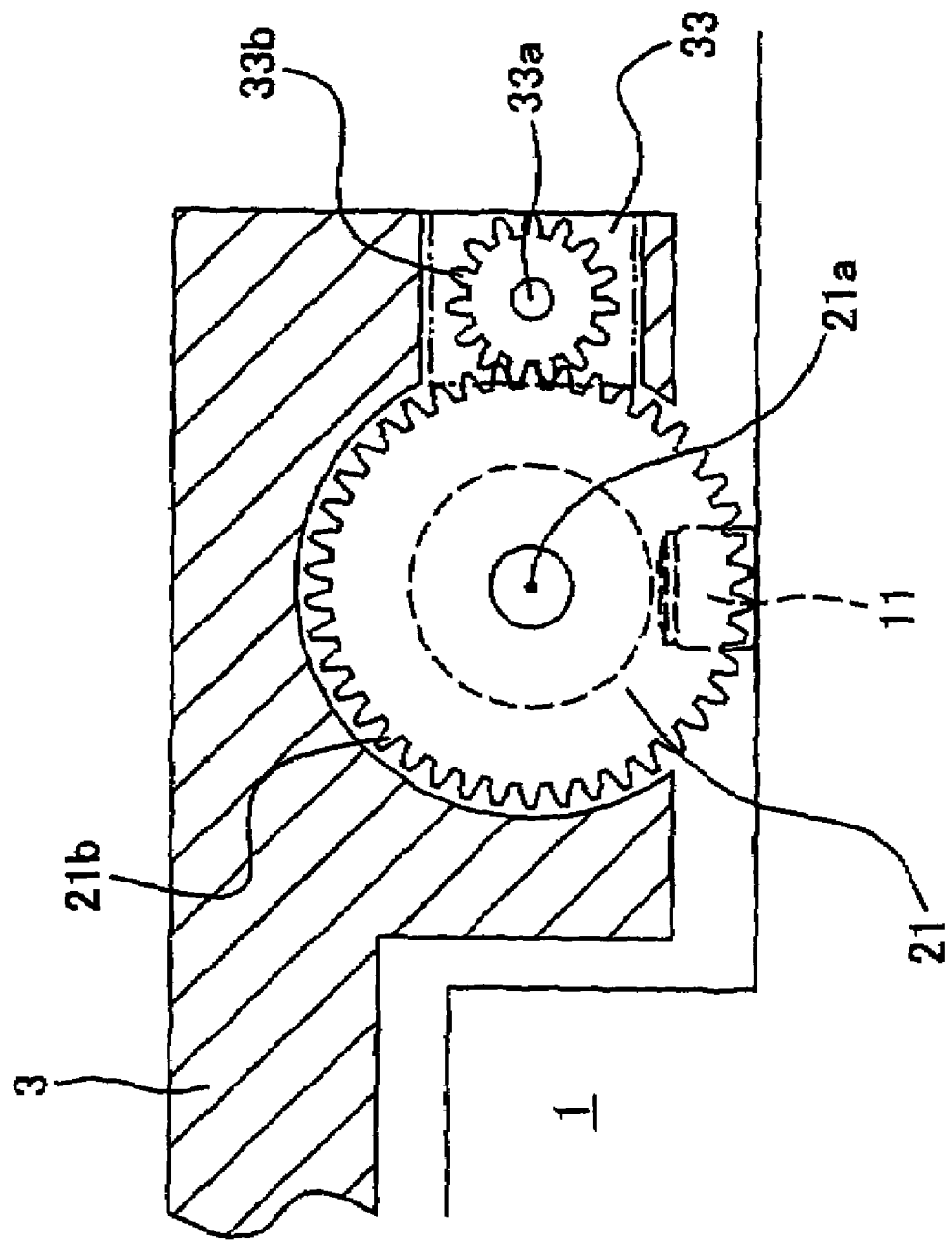
FIG. 19 is a sectional view of a drive mechanism in a modification of the drive mechanism in the first embodiment.
Figure 20:
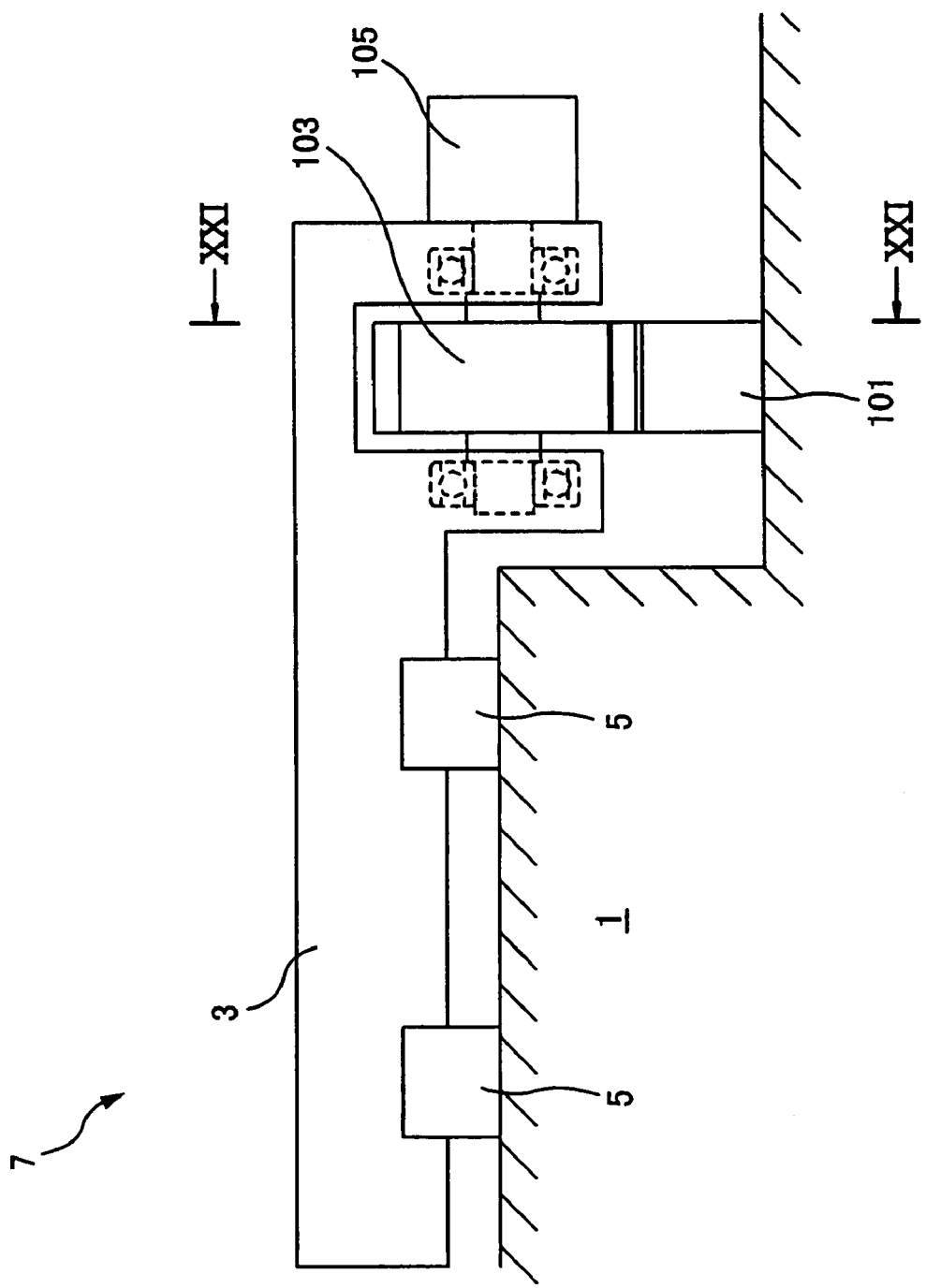
FIG. 20 is a front elevation of a conventional drive mechanism.
Figure 21:
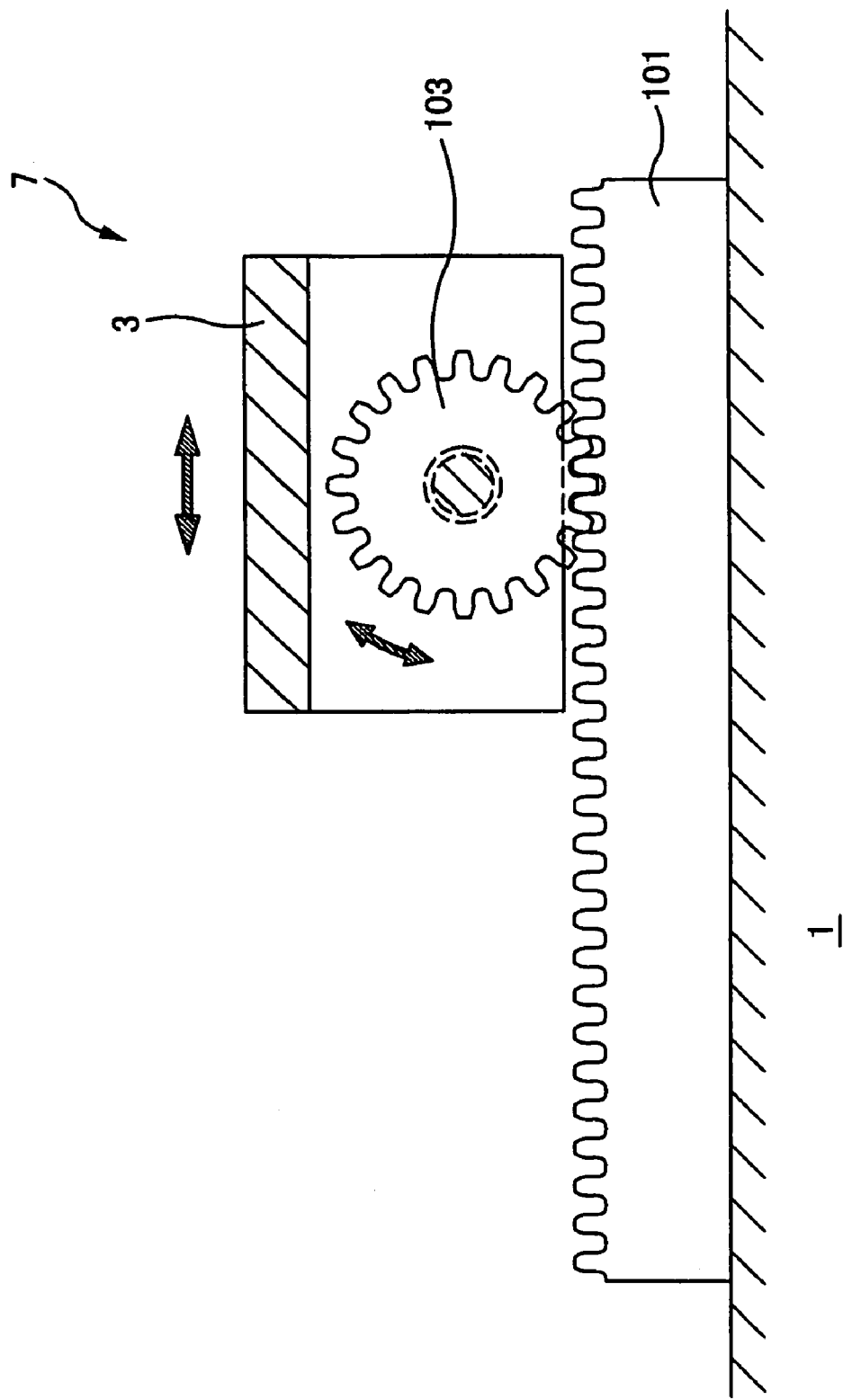
FIG. 21 is a sectional view taken on line XXI-XXI in FIG. 20.
Figure 22:
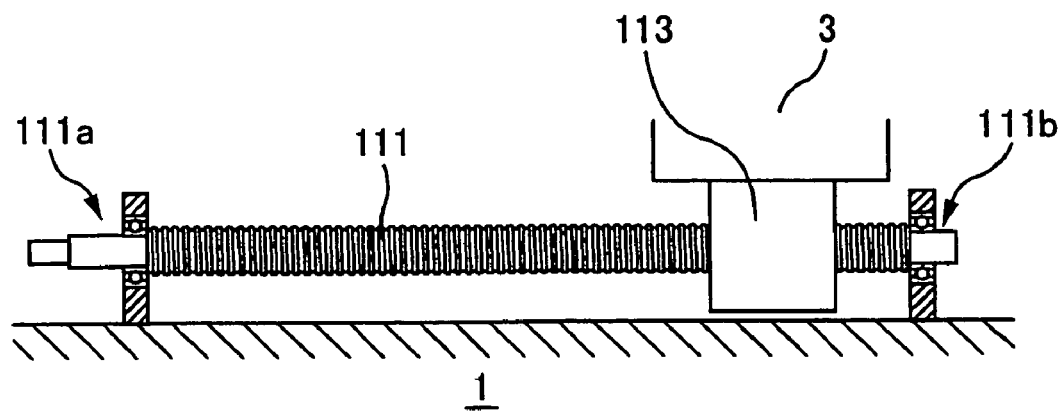
FIG. 22 is a side elevation of another conventional drive mechanism.
Figure 23:
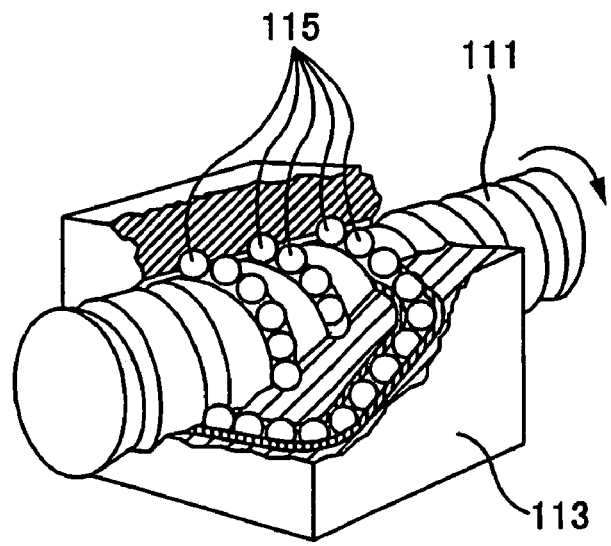
FIG. 23 is a partly cutaway perspective view of the drive mechanism shown in FIG. 22.

The drive mechanism 31 may be a gear-drive mechanism as shown in the cross sectional view of FIG. 19 instead of the wrapping-connector drive mechanism as in this embodiment. The gear-drive mechanism includes a pinion 33b fixedly mounted concentrically on the output shaft 33a of the motor 33, a gear 21b fixedly mounted concentrically on the shaft of the cylindrical cam 21 and engaged with the pinion 33b. The rotative power of the motor 33 is transmitted through the pinion 33b and the gear 21b to the cylindrical cam 21 to drive the cylindrical cam 21 for rotation.

The output shaft of the motor may directly be connected to the shaft of the cylindrical cam by a suitable coupling means.

Although the drive mechanisms in the first and the second embodiment are provided with the single cam follower row and two cam follower rows, respectively, the drive mechanism according to the present invention may be provided with cam followers arranged in three or more cam follower rows.

Although the drive mechanism in the third embodiment is provided with cam followers arranged in the two cam follower rows, the drive mechanism may be provided with cam followers arranged in three or more parallel cam follower rows.

Although the cylindrical cam included in each of the drive mechanisms in the foregoing embodiments is provided with the cam groove, the cylindrical cam may be provided with a helical cam ridge instead of the helical cam groove.

The bases mentioned in the description of the preferred embodiments are fixedly installed on the floor. The bases may either be directly or indirectly fixed to the floor. For example, the base may be fixed to a wall set up on the floor, and the wall may be either upright or oblique.

The axis of rotation of the cylindrical cam, and the cam follower row are extended in the direction of the directions of linear movement in this embodiment. The concept of extension of the axis of rotation and the cam follower row in in the direction of the directions of linear movement includes the extension of the same at a slight angle to the directions of linear movement.

As apparent from the foregoing description, according to the present invention, the drive mechanism is capable of readily changing the stroke of the movable member, of maintaining substantially fixed rigidity regardless of the stroke, of facilitating maintenance work and of operating quietly, and satisfactory in durability. The drive mechanism included in the movable table unit is capable of restraining the free axial motion of the movable member due to backlashes and of positioning the movable member with a high degree of positioning accuracy.

Although the invention has been described in its preferred embodiments with a certain degree of particularity, obviously many changes and variations are possible therein. It is therefore to be understood that the present invention may be practiced otherwise than as specifically described herein without departing from the scope and spirit thereof.

What is claimed is:

1. A drive mechanism interposed between two members to make said two members move relatively with respect to each other, at least one of said two members being guided to move linearly in a linear moving direction, said drive mechanism comprising:

a plurality of rolling cam followers that are rotatably supported on one of said two members, that are arranged in said linear moving direction, and that are spaced from each other; and a cam that is rotatably supported on the other one of said two members and that is provided in its circumference with a cam groove in which said rolling cam followers engage, said cam groove being defined by a pair of inner side surfaces opposing each other and a bottom surface connecting said side surfaces, the rotation axis of said cam being arranged in the direction of said linear moving direction;

wherein said two members are made to move relatively with respect to each other by driving said cam to rotate and making said rolling cam followers engage successively in said cam groove and move in the direction of said rotation axis, two adjacent rolling cam followers being engaged in said cam groove simultaneously, and wherein said rolling cam followers are arranged at alternate long pitches and short pitches, the difference in length between said long pitches and said short pitches being substantially two times a gap formed between side surfaces of the cam groove and the cam followers of said drive mechanism so that said two adjacent rolling cam followers roll on said opposed inner side surfaces of said cam groove.

2. A drive mechanism according to claim 1, wherein:

a plurality of said cam followers are arranged in said linear moving direction to form a cam follower row; and at least two of these cam follower rows are aligned next to each other in said linear moving direction.

3. A drive mechanism according to claim 1, wherein:

said cam groove is a tapered groove in which the width of the groove narrows toward the bottom in depth; and said cam followers have a tapered cylindrical shape conforming to said tapered groove.

4. A drive mechanism according to claim 1, wherein:
both ends, in the direction of said rotation axis, of said cam are supported rotatably;
said cam groove is formed in the circumference of said cam throughout the length, in the direction of said rotation axis, of said cam;
said cam groove is a helical groove oriented toward one direction in the circumferential direction of said cam; and
before a cam follower that is engaged in said cam groove disengages from said cam groove, an adjacent cam follower engages in said cam groove.

5. A drive mechanism according to claim 4, wherein said length, in the direction of said rotation axis, of said cam is set shorter than a stroke of the linear movement of said member.

6. A movable table unit comprising said drive mechanism according to claim 1, wherein:
one of said two members that rotatably supports said cam followers is a base fixedly installed on a floor; and
the other one of said two members that rotatably supports said cam is a table supported on said base to move linearly and relatively with respect to said base.

7. A multiple movable table unit, comprising a plurality of movable table units according to claim 6, wherein the plurality of movable table units are stacked in multiple layers so that said movable table units move with respect to each other in different directions.

8. A drive mechanism interposed between two members to make said two members move relatively with respect to each other, at least one of said two members being guided to move linearly in a linear moving direction, said drive mechanism comprising:

a plurality of rolling cam followers that are rotatably supported on one of said two members, that are arranged in said linear moving direction, and that are spaced from each other; and a cam that is rotatably supported on the other one of said two members and that is provided in its circumference with a cam groove in which said rolling cam followers engage, said cam groove being defined by a pair of inner side surfaces opposing each other and a bottom surface connecting said side surfaces, the rotation axis of said cam being arranged in the direction of said linear moving direction;

wherein said two members are made to move relatively with respect to each other by driving said cam to rotate and making said rolling cam followers engage successively in said cam groove and move in the direction of said rotation axis, two adjacent rolling cam followers being engaged in said cam groove simultaneously, wherein said rolling cam followers are arranged at equal pitches, wherein a pitch of the cam groove varies so that said two adjacent rolling cam followers roll on respective said opposed inner side surfaces of said cam groove.

* * * * *